US012701068B2

(12) United States Patent
Filsfils et al.

(10) Patent No.: US 12,701,068 B2
(45) Date of Patent: Aug. 4, 2026

(54) ACTIVE AND PASSIVE MEASUREMENT ON DATA TRAFFIC OF A VIRTUAL PRIVATE NETWORK (VPN) SERVICE

(71) Applicant: Cisco Technology, Inc., San Jose, CA (US)

(72) Inventors: Clarence Filsfils, Brussels (BE); Rakesh Gandhi, Stittsville (CA); Pablo Camarillo Garvia, Madrid (ES); Ahmed Mohamed Ahmed Abdelsalam, L'Aquila (IT); Sonia Ben Ayed, Vanves (FR)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 18/609,148

(22) Filed: Mar. 19, 2024

(65) Prior Publication Data

US 2024/0430189 A1    Dec. 26, 2024

Related U.S. Application Data

(60) Provisional application No. 63/522,207, filed on Jun. 21, 2023, provisional application No. 63/522,226, (Continued)

(51) Int. Cl.
*H04L 43/106* (2022.01)
*H04L 43/0829* (2022.01)
*H04L 43/0852* (2022.01)
(52) U.S. Cl.
CPC ........ *H04L 43/106* (2013.01); *H04L 43/0829* (2013.01); *H04L 43/0852* (2013.01); *H04L 2212/00* (2013.01)

(58) Field of Classification Search
None
See application file for complete search history.

(56) References Cited

U.S. PATENT DOCUMENTS 7,551,567 B2 * 6/2009 Anthias ............... H04L 63/0245
370/252
8,743,768 B2 * 6/2014 Vasseur ................... H04L 45/26
370/312

(Continued)

FOREIGN PATENT DOCUMENTS

WO    WO2020092211 A1    5/2020

OTHER PUBLICATIONS

Search Report and Written Opinion for International Application No. PCT/US24/34597, Dated Oct. 8, 2024, 15 pages.

*Primary Examiner* — Ranodhi Serrao
(74) *Attorney, Agent, or Firm* — Lee & Hayes, P.C.

(57) ABSTRACT

This disclosure describes techniques and mechanisms for performing passive measurement for combined one-way latency, packet loss metrics along with liveness detection using customer data packets ingested at a sink node in hardware for Level 2 and Level 3 VPN services. The customer data packets are sampled and copied for measurement either at source node or sink node. The duplicated measurement packet headers are punted based on the IPv6 destination option type to hardware analytics engine at sink node for analytics that populates histogram bins using the timestamps from the packets. Using the transmitted packets during a period, and received packets in all the bins, packet loss is measured. Based on the packets received status, liveness state is detected by the sink node and notified to the source node.

18 Claims, 10 Drawing Sheets

Related U.S. Application Data filed on Jun. 21, 2023, provisional application No. 63/522,218, filed on Jun. 21, 2023.

(56) References Cited

U.S. PATENT DOCUMENTS

| | | | |
|---|---|---|---|
| 10,873,533 B1 * | 12/2020 | Ismailsheriff | H04L 47/2441 |
| 11,528,201 B1 * | 12/2022 | Richards | H04L 43/062 |
| 11,533,258 B2 * | 12/2022 | Gandhi | H04L 43/0847 |
| 11,563,771 B2 * | 1/2023 | Anderson | H04L 63/0428 |
| 2018/0152369 A1 | 5/2018 | McCallen et al. | |
| 2019/0190804 A1 | 6/2019 | Tang et al. | |
| 2020/0092211 A1 * | 3/2020 | Vytla | H04L 47/2483 |
| 2020/0112487 A1 * | 4/2020 | Inamdar | H04L 67/14 |
| 2020/0387746 A1 * | 12/2020 | Tedaldi | H04L 41/0893 |
| 2021/0111999 A1 * | 4/2021 | Gandhi | H04L 47/20 |
| 2021/0112002 A1 | 4/2021 | Pan et al. | |
| 2021/0160275 A1 * | 5/2021 | Anderson | H04L 63/1458 |
| 2021/0168657 A1 * | 6/2021 | Potharaju | H04W 28/0231 |
| 2021/0273874 A1 | 9/2021 | Agarwal et al. | |
| 2021/0329529 A1 | 10/2021 | Sun et al. | |
| 2022/0173992 A1 * | 6/2022 | Filsfils | H04L 43/0858 |
| 2023/0055046 A1 * | 2/2023 | Whited | H04J 3/0644 |
| 2023/0070939 A1 * | 3/2023 | Williams | H04L 45/121 |
| 2023/0076549 A1 * | 3/2023 | Gandhi | H04L 45/70 |
| 2023/0336450 A1 | 10/2023 | Filsfils et al. | |

* cited by examiner

INSTRUCTIONS 206

USER 204

NETWORK 202

NODE 1 108

TIME 1 218

NODE 2 114

TIME 2 220

NOTIFICATION(S) 138

TELEMETRY DATA 132

APPLICATION 124

TEST PACKET(S) 128

| ENCAPSULATION 208 <IPv6/SRv6 uSID ENCAP, END.UDT6>; <IPv6/SRv6 uSID ENCAP, END.UDT4>; <IPv6/SRv6 uSID ENCAP, END.UDT2>; | PT IPv6 DESTINATION OPTION 210 | CONNECTION TYPE 212 <IPv6-CUSTOMER (IN VRF)>; <IPv4-CUSTOMER (IN VRF)>; <L2-ETHERNET> | UDP FOR ENTROPY 214 (IPv4 ONLY) | NO PAYLOAD 216 |
|---|---|---|---|---|

200A

Figures 3B, 3C, 3D:
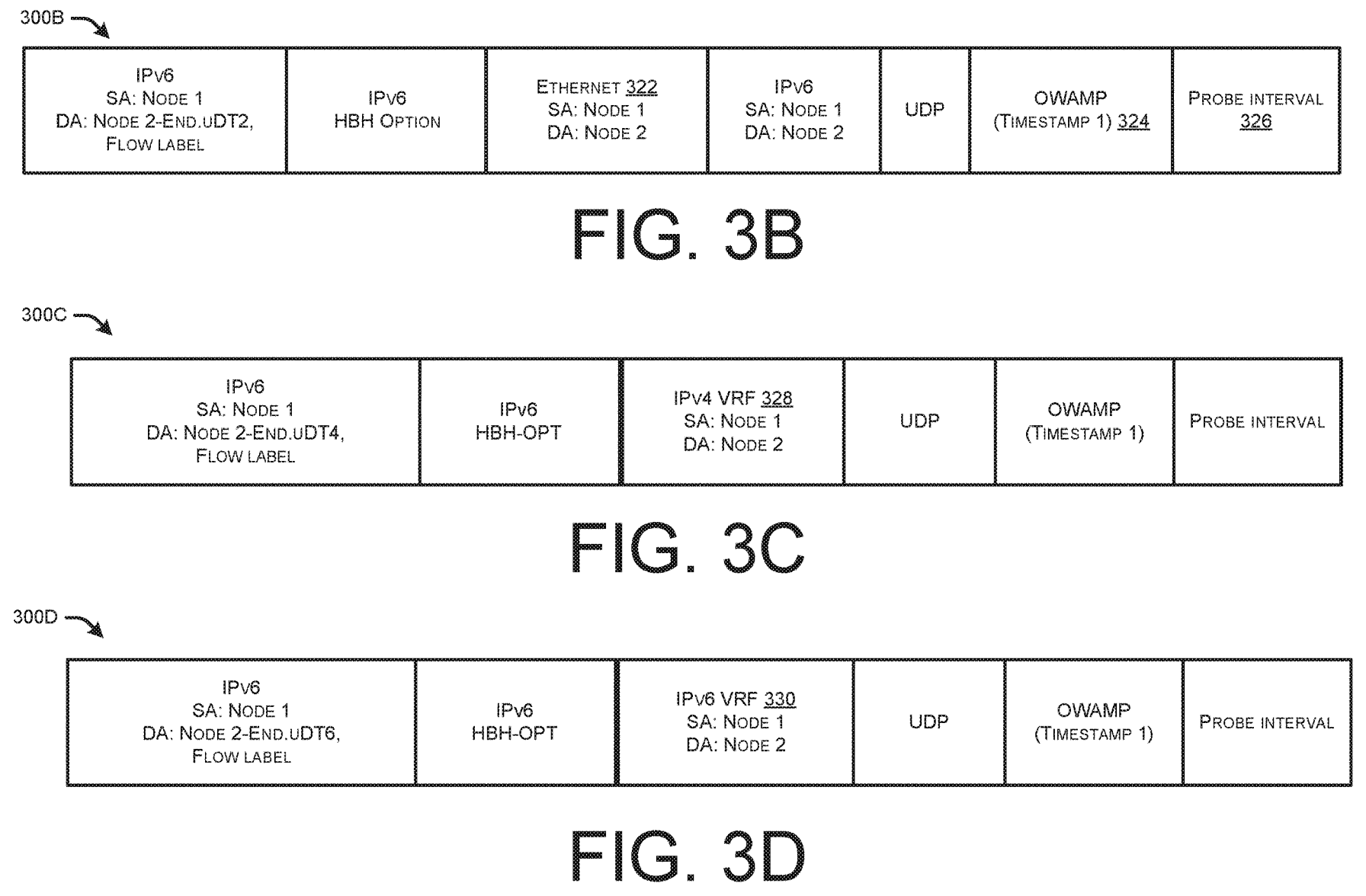

300B

| IPv6<br>SA: NODE 1<br>DA: NODE 2-END.UDT2,<br>FLOW LABEL | IPv6<br>HBH OPTION | ETHERNET 322<br>SA: NODE 1<br>DA: NODE 2 | IPv6<br>SA: NODE 1<br>DA: NODE 2 | UDP | OWAMP<br>(TIMESTAMP 1) 324 | PROBE INTERVAL<br>326 |

| IPv6<br>SA: NODE 1<br>DA: NODE 2-END.UDT4,<br>FLOW LABEL | IPv6<br>HBH-OPT | IPv4 VRF 328<br>SA: NODE 1<br>DA: NODE 2 | UDP | OWAMP<br>(TIMESTAMP 1) | PROBE INTERVAL |

| IPv6<br>SA: NODE 1<br>DA: NODE 2-END.UDT6,<br>FLOW LABEL | IPv6<br>HBH-OPT | IPv6 VRF 330<br>SA: NODE 1<br>DA: NODE 2 | UDP | OWAMP<br>(TIMESTAMP 1) | PROBE INTERVAL |

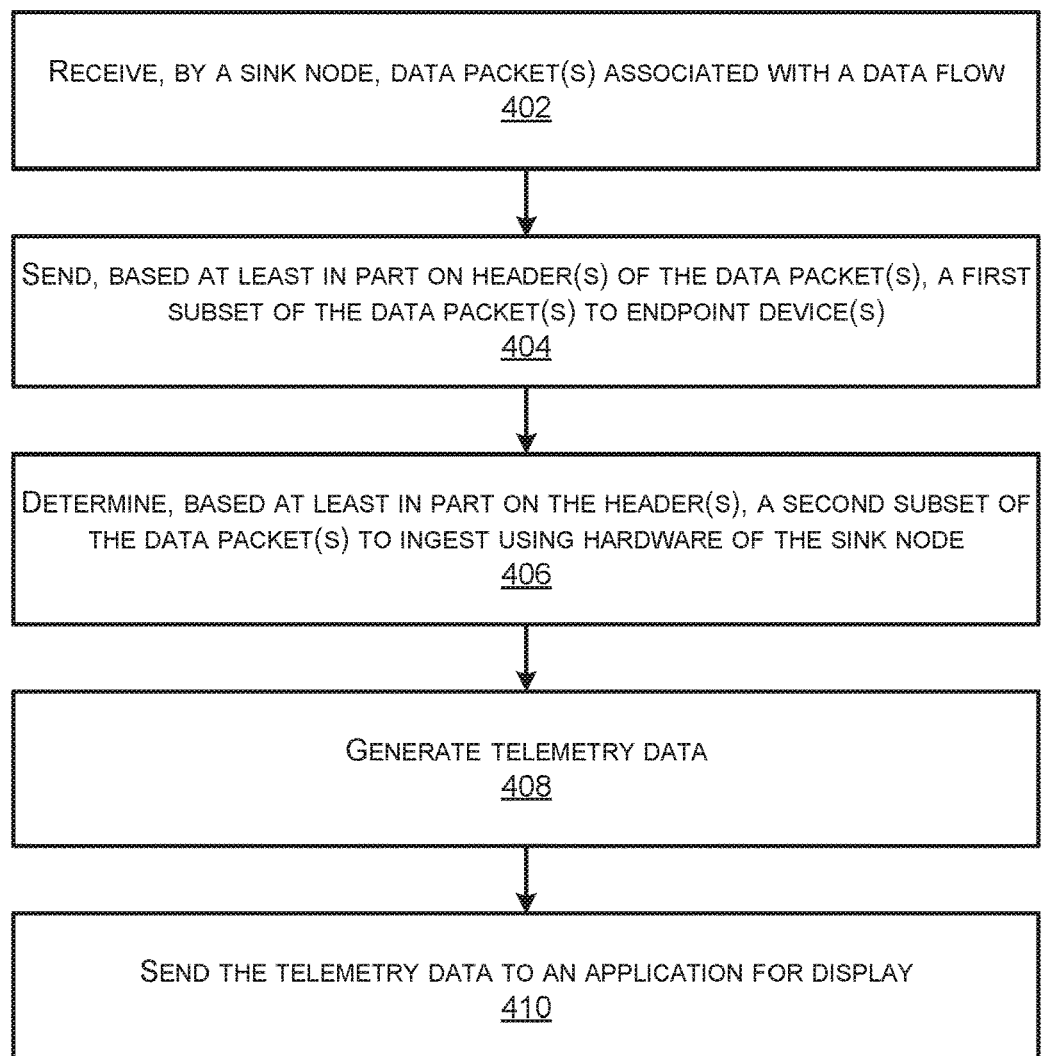

RECEIVE, BY A SINK NODE, DATA PACKET(S) ASSOCIATED WITH A DATA FLOW
402

SEND, BASED AT LEAST IN PART ON HEADER(S) OF THE DATA PACKET(S), A FIRST SUBSET OF THE DATA PACKET(S) TO ENDPOINT DEVICE(S)
404

DETERMINE, BASED AT LEAST IN PART ON THE HEADER(S), A SECOND SUBSET OF THE DATA PACKET(S) TO INGEST USING HARDWARE OF THE SINK NODE
406

GENERATE TELEMETRY DATA
408

SEND THE TELEMETRY DATA TO AN APPLICATION FOR DISPLAY
410

GENERATE TEST PACKETS TO PERFORM PATH TRACING
502

ENCAPSULATE THE TEST PACKETS
504

SEND THE TEST PACKETS TO A SINK NODE
506

DETERMINE TO PERFORM ANALYTICS ON THE TEST PACKETS
508

GENERATE, USING HARDWARE OF THE SINK NODE, TELEMETRY DATA
510

SEND THE TELEMETRY DATA TO AN APPLICATION FOR DISPLAY
512

600

GENERATE, BY A SOURCE NODE, TEST PACKETS FOR MONITORING LATENCY, LOSS, AND LIVELINESS
602

ENCAPSULATE THE TEST PACKETS
604

SEND THE TEST PACKETS TO A SINK NODE
606

DETERMINE, BY THE SINK NODE, TO PERFORM ANALYTICS ON THE TEST PACKETS
608

GENERATE, USING HARDWARE OF THE SINK NODE, TELEMETRY DATA
610

SEND THE TELEMETRY DATA TO AN APPLICATION FOR DISPLAY
612

ACTIVE AND PASSIVE MEASUREMENT ON DATA TRAFFIC OF A VIRTUAL PRIVATE NETWORK (VPN) SERVICE

CROSS REFERENCE TO RELATED APPLICATIONS

This application claims priority to U.S. Provisional Patent Application No. 63/522,226, filed Jun. 21, 2023, U.S. Provisional Patent Application No. 63/522,207, filed Jun. 21, 2023, and U.S. Provisional Patent Application No. 63/522,218, filed Jun. 21, 2023, the entire contents of which are incorporated herein by reference.

TECHNICAL FIELD

The present disclosure relates generally to the field of computer networking, and more particularly to active and passive measurements of traffic flows associated with a virtual private network.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, Data Center (DC) networks, and so forth.

Segment-routing (SR) is a new technology that greatly simplifies network operations and makes networks Software Defined Network (SDN)-friendly. SR architecture is defined in RFC 8402. Segment Routing Header is defined in RFC 8754 and SRv6 network programming is defined in RFC 8986. SRv6 uSID is defined in draft-ietf-spring-srv6-srh-compression. SR is applicable to data-planes such as the Multiprotocol Label Switching (MPLS) (typically referred to as 'SR-MPLS') data-plane and the Internet Protocol version 6 (IPv6) (typically referred to as 'SRv6') data-plane. Furthermore, SR technology is to be used with network slicing to provide services in 3rd Generation Partnership Project (3GPP) 5th Generation (5G) networks. For the new 5G networks, service providers are planning to deliver Ultra-Reliable Low-Latency Communication (URLLC) services. Traffic flows through 5G network paths are expected to satisfy certain constraints as defined in customer Service Level Agreements (SLAs). For example, services such as tele-medicine, on-line gaming, autonomous connected cars, stock market trading and many mission-critical applications have strict end-to-end constraints. Determining constraint violations is an important aspect of this new technology.

Existing solutions include two-way active measurement protocols (TWAMP) as well as simple two-way active measurement protocols (STAMP). In TWAMP, the active measurement packets derive the flow-label value using the different IP header (e.g., egress and ingress loopback addresses) compared to the customer data packets (CE addresses) and, thus, do not follow the same equal-cost multi-path (ECMP) pathway as the customer traffic flow.

TWAMP is defined in RFC 5357 and STAMP is defined in RFC 8762 and allows to collect timestamps from two nodes and detect synthetic packet loss using sequence number. As TWAMP is two-way, reply packets are sent back to the sender that reduces the scale. For instance, in TWAMP, probe packets may be generated by an ingress node and sent to an egress node. The egress node then sends the probe packets back to the ingress node, where the ingress node can use timestamps to measure latency and detect synthetic packet loss based on looking at packet sequence numbers. Further, in TWAMP, when a packet loss is detected, the ECMP hash parameter (Flow-label) is automatically changed to use a different ECMP path.

However, some networks have a requirement to monitor specific traffic flow and specific ECMP paths used by that traffic flow, which is not possible using existing techniques. Accordingly, identifying specific pathways in which problems exist can be difficult and time consuming, resulting in longer outages to customers. Moreover, as TWAMP utilizes synthetic probes, creating test environments for each pathway can be resource intensive, resulting in network efficiency degrading. Moreover, a key challenge when doing network measurement using synthetic probes is to ensure that the probes measure the same experience as the customer packet.

Accordingly, there is a need to monitor performance latency, loss, and liveness (connectivity) of customer traffic in service provider and data center networks to be able to provide guaranteed service and to detect and isolate the problems in the network quickly.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 3A-3D illustrate an example environment and exemplary test packets associated with the system described in FIG. 1B.

FIG. 4 illustrates a flow diagram of an example method for passive measurement of data traffic of a VPN service associated with the systems described in FIGS. 1-3.

DESCRIPTION OF EXAMPLE EMBODIMENTS

Overview

Figure 1A:
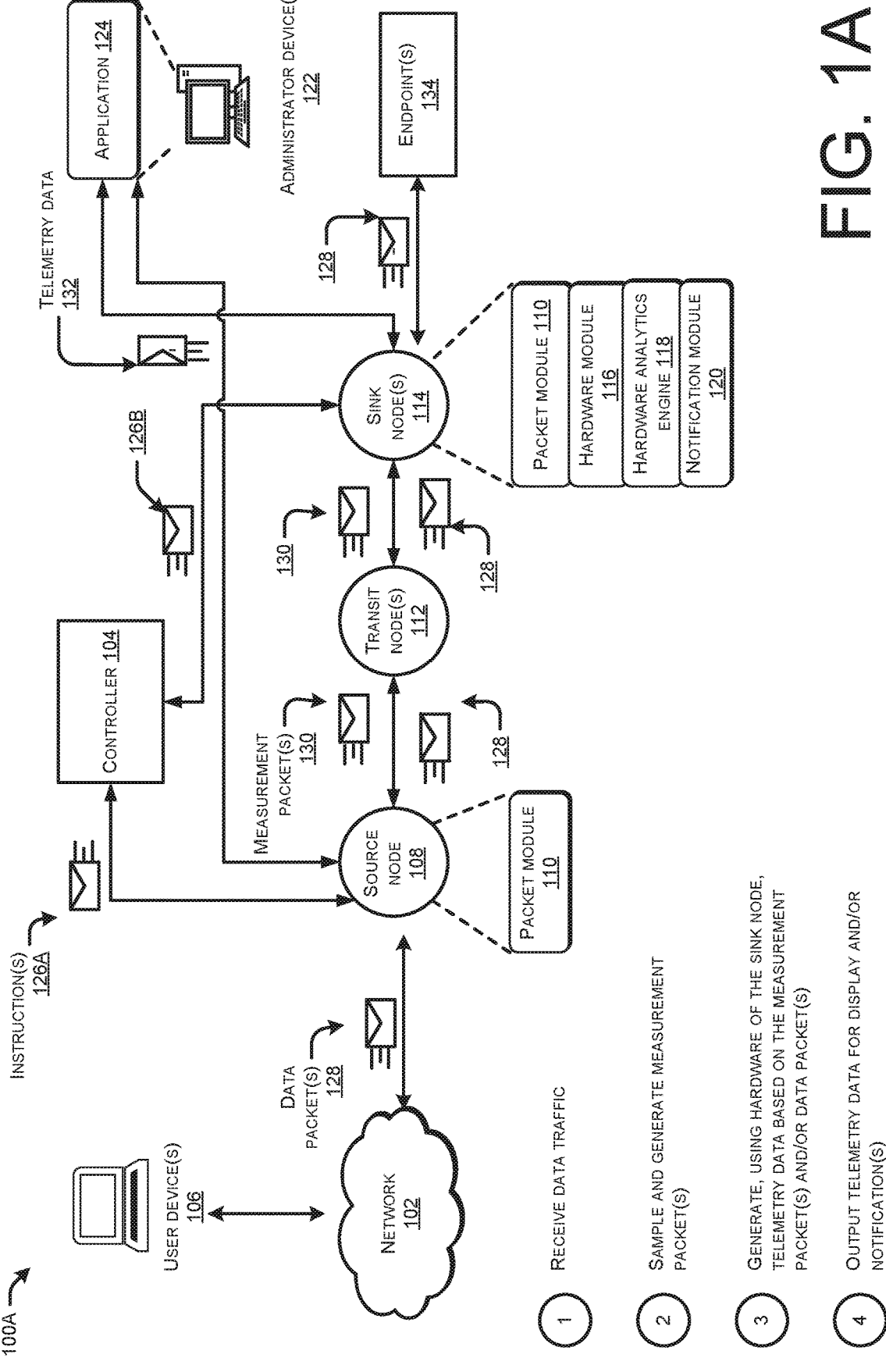
FIG. 1A illustrates a system-architecture diagram of an environment in which a system can perform passive path tracing, liveliness, loss, and latency measurements within a VPN.

The present disclosure relates generally to the field of computer networking, and more particularly to active and passive measurements of traffic flows associated with a virtual private network (VPN).

A method to perform the techniques described herein may include receiving, by a sink node within the VPN and from a source node, data packets associated with a data flow of a customer. Further the method may include sending, based at least in part on headers of the data packets, a first subset of the data packets to one or more endpoint devices. Additionally, the method may include determining, based at least in part on the headers of the data packets, a second subset of the data packets to ingest subset using hardware of the sink node. The method may also include generating, based at least in part on ingesting the second subset of the data packets, telemetry data. The method may include sending, to an application on a user device, the telemetry data, wherein the telemetry data is displayed via a user interface of an application.

Another method to perform the techniques described herein may include generating, by a source node, probe packets to monitor latency, loss, and liveliness on a sink node. Further the method may include encapsulating, by the source node, the probe packets to generate test packets, wherein encapsulating comprises adding a UDP header. Additionally, the method may include sending, from the source node and to a sink node, the test packets. The method may also include determining, by the sink node, to perform analytics on the test packets. The method may include generating, using hardware of the sink node, telemetry data associated with the test packets. The method may also include sending, to an application on a user device, the telemetry data for display.

Moreover, an additional method to perform the techniques described herein may include generating, by a source node and within the VRF, probe packets to monitor latency, loss, and liveliness. Further the method may include encapsulating, by the source node, the probe packets to generate test packets, wherein encapsulating comprises adding a path tracing destination option to the headers of the test packets. Additionally, the method may include sending, from the source node and to a sink node, the test packets. The method may also include determining, by the sink node and based at least in part on the headers, to perform analytics on the test packets. The method may include generating, using hardware of the sink node, telemetry data associated with the test packets. The method may also include sending, to an application on a user device, the telemetry data for display.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, Data Center (DC) networks, and so forth.

Segment-routing (SR) is a new technology that greatly simplifies network operations and makes networks Software Defined Network (SDN)-friendly. SR architecture is defined in RFC 8402. Segment Routing Header is defined in RFC 8754 and SRv6 network programming is defined in RFC 8986. SRv6 uSID is defined in draft-ietf-spring-srv6-srh-compression. SR is applicable to data-planes such as the Multiprotocol Label Switching (MPLS) (typically referred to as 'SR-MPLS') data-plane and the Internet Protocol version 6 (IPv6) (typically referred to as 'SRv6') data-plane. Furthermore, SR technology is to be used with network slicing to provide services in 3rd Generation Partnership Project (3GPP) 5th Generation (5G) networks. For the new 5G networks, service providers are planning to deliver Ultra-Reliable Low-Latency Communication (URLLC) services. Traffic flows through 5G network paths are expected to satisfy certain constraints as defined in customer Service Level Agreements (SLAs). For example, services such as tele-medicine, on-line gaming, autonomous connected cars, stock market trading and many mission-critical applications have strict end-to-end constraints. Determining constraint violations is an important aspect of this new technology.

Existing solutions include two-way active measurement protocols (TWAMP), as well as simple two-way active measurement protocols (STAMP), where the active measurement packets derive the flow-label value using the different IP header (egress and ingress loopback addresses) than the customer data packets (CE addresses) and not follow the same ECMP path as the customer traffic flow.

TWAMP is defined in RFC 5357 and STAMP is defined in RFC and 8762 and allows to collect timestamps from two nodes and detect synthetic packet loss using sequence number. As TWAMP is two-way, reply packets are sent back to the sender that reduces the scale. For instance, in TWAMP, probe packets may be generated by an ingress node and sent to an egress node. The egress node then sends the probe packets back to the ingress node, where the ingress node can use timestamps to measure latency and detect synthetic packet loss based on looking at packet sequence numbers. Further, in TWAMP, when a packet loss is detected, the ECMP hash parameter (Flow-label) is automatically changed to use a different ECMP path.

However, some networks have a requirement to monitor specific traffic flow and specific ECMP paths used by that traffic flow, which is not possible using existing techniques. Accordingly, identifying specific pathways in which problems exist can be difficult and time consuming, resulting in longer outages to customers. Moreover, as TWAMP utilizes synthetic probes, creating test environments for each pathway can be resource intensive, resulting in network efficiency degrading. Moreover, RFC 9197 defines in-situ OAM (IOAM) data fields that may be carried with customer data traffic. However, these IOAM data fields are difficult to implement in hardware of nodes due to read and write operation depth limitations.

Accordingly, there is a need to monitor performance latency, loss, and liveness (connectivity) of customer traffic in service provider and data center networks to be able to provide guaranteed service and to detect and isolate the problems in the network quickly.

There is also a need to collect performance data from the network for network-wide analytics and observability to enable AI and machine learning to improve the network efficiency and prevent network service degradation and outages and for predictive networking.

Moreover, there is a need to provide hardware-based analytics on the IOS-XR reflector node for AI and machine learning, including for third party generated probes. TWAMP extensions required for per-hop delay and tracing packet path in the network.

This disclosure describes techniques and mechanisms for passive measurement for combined one-way latency, packet loss metrics along with liveness detection using customer data packets ingested at the sink node (Egress node) in hardware for Level 2 (L2) and Level 3 (L3) VPN services. The techniques may include receiving, by a sink node within the VPN and from a source node, data packets associated with a data flow of a customer. The techniques may include sending, based at least in part on headers of the data packets, a first subset of the data packets to one or more endpoint devices. The techniques further include determining, based at least in part on the headers of the data packets, a second subset of the data packets to ingest subset using hardware of the sink node. The techniques also include generating, based at least in part on ingesting the second subset of the data packets, telemetry data. The techniques may include sending, to an application on a user device, the telemetry data, wherein the telemetry data is displayed via a user interface of an application for network observability.

This disclosure also describes techniques and mechanisms for active measurement for combined one-way latency, packet loss metrics along with liveness detection using OWAMP probes generated at the source node using the same encapsulation (IPv6/SRv6/VPN or IPv6/VXLAN or IPv6/GRE or IPv4/VXLAN or IPv4/GRE, IPv4/MPLS, etc.) as data traffic in hardware (e.g., at a rate of 3.3 msec) or by third party box and ingested at the sink node (e.g., such as an IOS-XR router) also in hardware for L3 and L2 VPN services. The encapsulation on source node may be dynamically added by the forwarding pipeline for the customer data traffic or explicitly provisioned by the operator. The techniques may include generating, by a source node, probe packets to monitor latency, loss, and liveliness on a sink node. The techniques may include encapsulating, by the source node, the probe packets to generate test packets, wherein encapsulating comprises adding a UDP header. The techniques further include sending, from the source node and to the sink node, the test packets. The techniques also include determining, by the sink node, to perform analytics on the test packets. The techniques include generating, by the sink node and using hardware of the sink node, telemetry data. The techniques may include sending, to an application of a user device, the telemetry data for display for network observability.

This disclosure further describes techniques and mechanisms for active measurement for combined one-way latency, packet loss metrics along with liveness detection using path tracing (PT) probes generated at the source node in hardware or by a third-party box and ingested at the sink node also in hardware for L3 and L2 VPN services. The techniques may include generating, by a source node and within the VRF, probe packets to monitor latency, loss, and liveliness. The techniques may include encapsulating, by the source node, the probe packets to generate test packets, wherein encapsulating comprises adding a path tracing destination option to the headers of the test packets. The techniques may comprise sending, from the source node and to a sink node, the test packets. The techniques may also include determining, by the sink node and based at least in part on the headers, to perform analytics on the test packets. The techniques may further include generating, using hardware of the sink node, telemetry data associated with the test packets. The techniques may also include sending, to an application on a user device, the telemetry data for display for network observability.

As used herein, the monitoring performance and OAM of data traffic flow using synthetic probe messages is referred to as "active" measurement while using the actual customer traffic flow is referred to as "passive" measurement.

In some examples, the system may extend TWAMP and STAMP for "one-way" hardware analytics on sink node for Level 2 (L2) VPN and Level 3 (L3) VPN services and to carry Hop-by-hop option for recording per-hop timestamp, interface ID and interface load. In some other examples, the two-way active measurement protocol is split as two one-way active measurement protocol sessions and binding the two sides of the source and sink using session identifier and other measurement parameters. In some other examples, TWAMP measurement does not generate reply from the sink node and that is based on the TLV carried in the TWAMP packet or alternatively, based on different UDP destination port or locally provisioned flag.

In some examples, the system may be implemented by one or more nodes (e.g., source node, transit node(s), sink node(s) within a network. In some examples, the one or more nodes may comprise network devices (access switch, routers, servers, etc.). In some examples, the network devices may correspond to Cisco's IOX-XR and/or IOS-XE devices.

In some examples, the PT probes generated at the source node are generated by hardware at a rate of 3.3 milliseconds. In some examples, the system may generate separate path tracing measurement VRFs, where each measurement VRF has a loopback based on a different IGP flex algorithm. In some examples, path tracing sessions within the path tracing measurement VRF may be created using the loopback addresses (e.g., IPv6, IPv4, etc.) in each IGP Flex-Algorithm. In this way, the system may improve scaling (e.g., the number of sessions and path tracing) while reducing network resource usage compared to using customer VRFs between source node(s) and sink nodes. In a similar fashion, OWAMP probes may be generated from separate OWAMP measurement VRFs for these reasons.

In some examples, the system may include a packet module. In some examples, the packet module is configured to receive data packet(s) from a user device(s) associated with customer data traffic (e.g., such as a customer accessing a particular service (e.g., internet site, application, etc.) via a VPN connection. In some examples, such as where network connection comprises a Level 2 (L2) VPN connection, the data packet(s) may comprise a MAC address header and a payload. For instance, the data packet(s) may have the following format: <MAC><Payload>. In some examples, such as where network connection comprises an L3 VPN (e.g., IPv4) connection, the data packet(s) may correspond to an IPv4 data packet. For instance, the data packet(s) may have the following format: <IPv4-Customer (in VRF)><Payload>. In some examples, such as where network connection comprises a Level 3 (L3) VPN (e.g., IPv6) connection, the data packet(s) may correspond to an IPv6 data packets. For instance, the data packet(s) may have the following format: <IPv6-Customer (in VRF)><Payload>.

The packet module may be configured to sample a portion of the data packet(s). For instance, the packet module may sample the data packet(s) by copying a subset of the data packet(s). The packet module may generate, using the copied subset, measurement packet(s). In some examples, generating the measurement packet(s) comprises encapsulating each data packet using IPv6 uSID (Segment Routing IPv6 (SRv6) Micro-Segment Identifier) encapsulation. In some examples, encapsulating comprises adding one or more headers, such as a path tracing header, a passive path tracing IPv6 destination option, a passive path tracing IPv6 hop-by-hop option, etc. The IPv6 destination option type for passive traffic measurement may be different value than the IPv6 destination option type for active PT measurement packets invoking different behaviors on the sink node.

For instance, in some examples, such as where network connection comprises an L2 VPN connection, the measurement packet(s) may comprise the following: <IPv6/SRv6 uSID Encap, END.uDT2><Passive IPv6 HBH Option> <Passive IPv6 Destination Option><MAC><Payload>. In some examples, such as where network connection comprises an L3 IPv4 connection, the measurement packet(s) may comprise the following: <IPv6/SRv6 uSID Encap, END.uDT4><Passive IPv6 HBH Option><Passive IPv6 Destination Option><IPv4-Customer (in VRF)><Payload>. In some examples, such as where network connection comprises an L3 IPv6 connection, the measurement packet(s) 130 may comprise the following: <IPv6/SRv6 uSID Encap, END.uDT6><Passive IPv6 HBH Option><Passive IPv6 Destination Option><IPv6-Customer (in VRF)><Payload>.

In some examples, the packet module may additionally or alternatively be configured to generate probe packet(s) and/or test packet(s). For instance, the packet module may receive instructions from a user device to generate probe packet(s). In this example, a VRF is created to test and monitor level 2 (ethernet) and level 3 (IPv4 and IPv6) VPN services. In some examples, the probe packet(s) may comprise one-way active measurement probes (OWAMP) packets. In some examples, the packet module may test packet(s) by encapsulating the probe packet(s) using SRv6 uSID encapsulation.

For instance, L3 (IPv6) probe packets may comprise the format of <IPv6 (VRF)><UDP><OWAMP>. In this example, the packet module may process the probe packets to generate test packets with the following format: <IPv6/

SRv6 uSID Encap, END.uDT6><Optional PT IPv6 HBH Option><IPv6-Customer (in VRF)><UDP><OWAMP>. In this example, the flow label is propagated in NPU from the OWAMP IPv6 header into the SRv6 uSID encapsulation. The flow label in IPv6 header of the OWAMP may be generated using a subset of the local timestamp value in the NPU. Hence, flow-label sweeping using local timestamp on the NPU for ECMP measurements may be utilized.

For instance, L3 (IPv4) probe packets may comprise the format of <IPv4 (VRF)><UDP><OWAMP>. In this example, the packet module may process the probe packets to generate test packets with the following format: <IPv6/ SRv6 uSID Encap, END.uDT4><Optional PT IPv6 HBH Option><IPv4-Customer (in VRF)><UDP><OWAMP>. In this example, the flow label is computed in NPU based on a 5-tuple of the inner IPv4 packet. Accordingly, the flow label is impacted by the UDP Source Port. Flow-label sweeping using different UDP source port for ECMP measurements.

For instance, L2 (Ethernet) probe packets may comprise the format of <L2-MAC><UDP><OWAMP>. In this example, the packet module may process the probe packets to generate test packets with the following format: <IPv6/ SRv6 uSID Encap, END.uDT2><Optional PT IPv6 HBH Option><L2 MAC><UDP><OWAMP>. In this example, the packet module may compute the flow label based on a 5-tuple of the L2 packet (MAC header). For instance, the flow label may be computed in an NPU of the source node. Flow-label sweeping may be performed using different fields in L2 packet and optionally VLAN tag for ECMP measurements.

In another example, the packet module may be configured to generate path tracing probe(s) and/or test packet(s). In this example, a path tracing VRF is created to test and monitor level 2 (ethernet) and level 3 (IPv4 and IPv6) VPN services. In some examples, the probe packet(s) may comprise path tracing (PT) probes. In some examples, the packet module may test packet(s) by encapsulating the probe packet(s) using SRv6 uSID encapsulation and adding a destination option header with a timestamp.

For instance, L3 (IPv6) probe packets may comprise the format of <IPv6 (VRF)>. Also, destination option need to be part of the outer IPv6 header Encap. In this example, the packet module may process the probe packets to generate test packets with the following format: <IPv6/SRv6 uSID Encap, END.uDT6><PT IPv6 Destination Option><IPv6-Customer (in VRF)><NO Payload>. In this example, the flow label is generated as part of the encapsulation and is propagated from the TWAMP IPv6 header into the SRv6 uSID encapsulation.

For instance, L3 (IPv4) probe packets may comprise the format of <IPv4 (VRF)><UDP>. In this example, the PT probe packet is not generated with a destination option as IPv4 packet cannot be generated with IPv6 destination option. In this example, the packet module may process the probe packets to generate test packets with the following format: <IPv6/SRv6 uSID Encap, END.uDT4><PT IPv6 Destination Option><IPv4-Customer (in VRF)><UDP for Entropy><NO Payload>. In this example and as part of encapsulation, the flow label is computed based on a 5-tuple of the inner IPv4 packet, and hence the FL is impacted by the UDP Source Port.

For instance, L2 (Ethernet) probe packets may comprise the format of <L2-MAC>. In this example, the packet module may process the probe packets to generate test packets with the following format: <IPv6/SRv6 uSID Encap, END.uDT2><PT IPv6 Destination Option><L2-

Ethernet><NO Payload>. In this example and as part of encapsulation, the flow label is computed in NPU based on a 5-tuple of the L2 packet (MAC header). Hence flow-label is impacted by the L2 packet (MAC header) and, optionally, a VLAN tag.

In some examples, the system may include a hardware module. In some examples, the hardware module is configured to receive one or more of data traffic, measurement packet(s), and/or test packet(s). In some examples, the hardware module is configured to process the packet(s). For instance, the hardware module may be configured to determine, based at least in part on the headers of the packet(s), whether to perform analytics on the packet(s). For instance, measurement packet(s) may be identified based on detecting the presence of an IPv6 destination option header, indicating that the packet is a measurement packet directed to the hardware analytics engine. For data packet(s) (e.g., customer data traffic that is not copied), the hardware module may forward the data packet(s) to an endpoint using encapsulation techniques.

In some examples, the hardware module is configured to decapsulate the packet(s). For instance, the hardware module may decapsulate the IPv6 header, remove the SRH and IPv6 Destination Option. For packet(s) that comprise an IPv6 destination option, the hardware module may forward the packet(s) to the hardware analytics engine for processing. In some examples, such as where the test packet(s) are generated based on OWAMP probes, the hardware module may identify the test packets and being directed to the hardware analytics engine based at least in part on the UDP destination port.

In some examples, the system may include a hardware analytics engine. In some examples, the hardware analytics engine is configured to receive the data packet(s), measurement packet(s), and/or test packet(s) and ingest the data using a NPU host processor. In some examples, the hardware analytics engine may comprise a C8000 platform such as Cisco's Silicon one ASIC. Unlike traditional hardware, which can only process 2,000 packets per second, by utilizing an NPU with the processing capabilities of Cisco's Silicon one ASIC (or similar processor), the current techniques are able to process 14 million packets per second.

In some examples, the hardware analytics engine may locally ingest probes in hardware analytics for latency and loss measurement. For instance, the hardware analytics engine may comprise a plurality of latency bins and/or traffic counters. For instance, the hardware analytics module may comprise 64 latency bins, or any suitable number of bins. In some examples, the latency bins may be mapped to one or more histogram bins. In some examples, the histogram bins may be populated using the timestamps from the packets. In some other examples, the telemetry data may comprise the percentile metric values and associated counters and those may be computed using the timestamps from the packets.

In some examples, the hardware analytics engine may comprise a bin mapping table. For instance, the bin mapping table may store values ranging from 0 to 255 milliseconds (ms), with a granularity of 1 ms. In this example, each millisecond value is mapped to a histogram bin by doing lookup in a configurable table stored in memory of the node. Where the granularity is poor, the system may want to increase it. Accordingly, the system may utilize one of the following options to increase granularity: (1) the range of values is [0, 127] and each bin represents 0.5 ms; or (2) the range of values is [0, 63] and each bin represents 0.25 ms. In some examples, the mapping from milliseconds to bin is configurable dynamically, such as via an API, and may be performed on a per session basis. As an example, a user can configure mapping bins as (10 msec-15 msec) as associated with counter 3 (e.g., a latency bin counter), bins (16 msec-25 msec) as associated with counter 4, etc. Accordingly, there are no platform limitations for setting configurations.

In some examples, the hardware analytics engine may calibrate the histogram bins. For example, the hardware analytics engine may initially configure one or more histogram bin(s) based on either Propagation Latency Application (PLA, a cloud-native SR Application) data or user-configuration. In some examples, such as in the case of topologies where all the end-to-end paths have a similar expected latency, a user may manually configure the histogram bins (e.g., nation-wide network in Europe). In some examples, such as in the case of larger networks, the initial calibration may be based on PLA. For instance, PLA data may comprise a sum of propagation latency for all the links along expected packet delivery path. In some examples, the histogram bins may be recalibrated.

In some examples, the hardware analytics engine may dynamically re-calibrate the histogram bins based on expected latency values. In some examples, the hardware analytics engine may adapt a number of hardware resource counters based on need to zoom into histogram bins across ECMPs when multi-peak detected. In some examples, a user may configure one or more of the latency bins, median value of a latency bin threshold, etc. In some examples, the hardware analytics module is configured to set threshold values for each latency bin, detect mis-calibrations of the thresholds, and update the median value.

In some examples, the hardware analytics engine is configured to generate and output telemetry data. In some examples, the telemetry data may comprise one or more histograms and/or one or more histogram bin(s) including associated thresholds and counters (for example, bin1=0-5 ms, count1; bin2=6-8 ms, count2; . . . ). In some examples, the telemetry data may comprise latency data, liveliness data, and packet loss data associated with each ECMP pathway. In some other examples, the telemetry data may comprise the percentile metric values and associated counters.

In some examples, the telemetry data is generated based on the latency bins and/or counters. In some examples, the hardware analytics engine may use the transmitted packets during a period, and received packets in all the bins, measure packet loss. In some examples, the expected transmit rate and expected transmit packet counter may be used on sink node to measure packet loss. In some examples, the hardware analytics engine may determine, based on the packets received status, a liveness state and notify, via the notification module, the source node. In some other examples, the telemetry data is generated based on the percentile metric values. In some other examples, source node may generate telemetry if number of generated probe packets differ from the expected probe packets transmitted.

In some examples, the telemetry data may be generated and output on source and sink nodes at the same time based on a time interval (e.g., every 15 minutes, 10 minutes, or any other suitable time period) between peer-to-peer PTP or NTP clock synced nodes.

In some examples, the hardware analytics engine may utilize machine learning and/or artificial intelligence to generate the telemetry data. For instance, Machine-learning algorithms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in memory of the source node or the sink node for use at a time after the data models have been trained (e.g., at runtime).

In some examples, the system may include a notification module. In some examples, the notification module is configured to generate notifications. For instance, in some examples, a PTP clock sync required between source and sink nodes for latency and telemetry triggers. In this example, when the sink node initially receives a first measurement packet and/or a first test packet, a liveness state may be initially declared up. The notification module may determine a time interval associated with receiving packet(s). For example, the time interval for a non ECMP pathway may comprise 10 ms. In this example, if the sink node has not received a packet within 10 msec timer, liveness is declared down. The notification module may then generate a notification of liveness failure and send the notification directly from the sink node to the source node to trigger protection switchover. ECMP pathway time intervals may vary. Accordingly, a time interval for ECMP pathways may comprise 200 ms, although any suitable time interval may be used. The notification module may also determine the liveness as down based on amount of packet loss, for example, 3% packet loss in an interval.

In some examples, such as an embodiment where the system is passively measuring customer data traffic, the system may be configured to measure absolute packet loss. For instance, the system may measure absolute packet loss using traffic counters that using SRv6 VPN uSID on the source node and sink node using alternate marking of traffic. In this example, the source node may toggle, in hardware of the source node, the marking bit in IPv6 destination option or IPv6 flow-label or IPv6 source address or other field in the IPv6 header or GRE header or VXLAN header every computation interval. Further, in this example, the sink node needs two traffic counters per source node (e.g., per locator (for dual marking)) and the source node also needs two traffic counters per sink node (e.g., per locator (for alternate marking)). Accordingly, the system may measure traffic for each source address, destination address, VRF, differentiated services code point (DSCP), segment list ID (SL-ID), etc. for each marking and telemetry the counters every computation interval, with 10 seconds added to detect absolute loss per VRF per DSCP for the VPN service. To simplify the configuration, the alternate marking bit can also be set based on the current time on the node. It can simply look at a bit in timestamp and based on the value of that bit, it can set the marking at the source node. The source and sink nodes clock are synchronized and per-determined interval on both sides is used to alternate the marking on both nodes at the same time to generate telemetry and detect packet loss, for example, every 15 minutes at 10:00 AM, 10:15 AM, 10.30 AM, etc.

In some examples, such as where the network corresponds to a time sensitive network, a user may define a time interval (e.g., a deadline), which may be added to the measurement packet(s) and/or test packet(s). In this example, the deadline time interval may be added to an environment where customer data traffic is passively monitored. For instance, the measurement packet(s) and/or test packet(s) may comprise a passive IPv6 hop-by-hop options to record midpoint compressed data (MCD) (e.g., per-hop short timestamps, per-hop short interface identifiers, and per-hop interface load, etc.). In this example, the source node may add a deadline time interval to the passive hop-by-hop option. In some examples, the deadline time interval may be configured for a specific customer traffic flow using the access control list (ACL) classification(s). In some examples, the deadline time interval may be added to a passive IPv6 Destination Option included on test packet(s) and/or the measurement packet(s). In this example, as the measurement packet(s) and/or test packet(s) traverse from the source node to transit node(s), each transit node will compare the timestamp of when the packet is received to the deadline. Where the deadline has expired, the transit node will drop the packet. Accordingly, the network may drop customer traffic and recover expired bandwidth faster than existing techniques. An alert may also be generated to notify the operator of the deadline expiry and resulting traffic drop.

In this way, the system may provide a unified solution at the sink node for active path tracing probes and passive measurement of latency, loss, and liveliness. For instance, the system may enable sampling (e.g., tagging 1 packet out of every 1,000 packets and/or 1 packet out of every 10,000 packets, etc.) and copying of customer data packets at source node (ingress PE) for generating measurement packets that match Customer flow for ECMP pathways. Further, by performing packet sampling for measurement of customer traffic at the sink node and based on hardware capabilities of the sink node, the system improves network capabilities by preventing the sink node from being overloaded by the source node, as in traditional techniques. Further, the system provides new behavior to support time sensitive networks, such that packets can be dropped in real time along a pathway, based on a deadline being reached, thereby freeing up bandwidth in real time.

Moreover, the system may perform testing within a VRF environment. For instance, by utilizing OWAMP probe packets that are extended to use Hop-By-Hop option (including IOAM, Path Tracing or future data recording) for measurement, the system uses the same encapsulation as customer data traffic and eliminates the need to sample data traffic, thereby avoiding scaling problems based on data traffic flowing at line rate, accounting for MTU to avoid dropping customer traffic, performance impacts caused by sampling traffic, etc. Moreover, the system enables identification of problems within each particular ECMP pathway and offers finer granularity by identifying particular hops within a ECMP pathway at which a problem has occurred. Further, by creating a VRF environment for measurement and creating a new hash behavior, the system provides test packets that mimic customer data traffic, thereby providing the same experience as customer packets, accurate measurements, and scalability within a network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an example environment in which a system 100A can perform passive path tracing, liveness, loss, and latency measurements within a VPN. While system 100A is described as including various features and examples, it is understood that the examples described in system 100B of FIG. 1B and/or one or more of the features described in system 100B of FIG. 1B and FIGS. 2A-2D and/or FIGS. 3A-3D may be implemented and/or used in accordance with the system 100A of FIG. 1A.

In some examples, the system 100A may include a network 102. The network 102 may include one or more networks implemented by any viable communication technology, such as wired and/or wireless modalities and/or technologies. The network 102 may include any combination of Personal Area Networks (PANs), software defined cloud interconnects (SDCI), Local Area Networks (LANs), virtual private networks (VPNs), software defined networks (SDNs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed, software defined WANS (SD-WANs)—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

In some examples, the network 102 may comprise a service network and/or a data center network. The service network(s) may include devices housed or located in one or more data centers. The service network may include one or more networks implemented by any viable communication technology, such as wired and/or wireless modalities and/or technologies. The service network may include any combination of Personal Area Networks (PANs), VPNs, SDNs, SD-WANs, Local Area Networks (LANs), Wireless LANs, Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed- and/or any combination, permutation, and/or aggregation thereof. The service network may include devices, virtual resources, or other nodes that relay packets from one network segment to another by nodes in the computer network. The service network may include multiple devices that utilize the network layer (and/or session layer, transport layer, etc.) in the OSI model for packet forwarding, and/or other layers.

The data centers may be physical facilities or buildings located across geographic areas that designated to store networked devices that are part of a manufacturer. The data centers may include various network devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the packet-forwarding networks may not be located in explicitly defined data centers, but may be located in other locations or buildings. In some examples, the site(s) comprise network device(s), which may correspond to any computing device, routers, switches, computers, or any other type of network device.

The system 100A may comprise a controller 104. In some examples, the controller 104 corresponds to a system that has complete visibility into the security fabric of a given network (e.g., enterprise network, smaller network, etc. In some examples, the controller 104 may comprise a memory, one or more processors, etc., In some examples, the controller 104 may comprise a routing controller.

In some examples, the controller 104 may be configured to communicate with administrator device(s) 122. As illustrated, the administrator device(s) 122 may comprise an application 124. In some examples, the application 124 may correspond to an application provided by a service provider (e.g., such as Cisco) that enables an end user (e.g., administrator, etc.) of the network 102 to access the controller 104. For instance, the application 124 may correspond to an analytics application (e.g., such as Cisco's vAnalytics, third party application, etc.). In some examples, the controller 104 may be configured to receive instructions from the administrator device(s) 122 and/or application 124. In some examples, the application 124 is configured to receive the telemetry data and display one or more graphs. For instance, the graphs may comprise one or more of a latency distribution plot, one or more histograms, one or more notifications indicating anomalies (e.g., specific pathways, specific node(s), etc.) within the network, and/or packet loss within the network. In some examples, the application 124 may be configured to enable a user (e.g., network administrator) to perform one or more actions with respect to the network. For instance, the user may identify one or more corrective actions to take with respect to a pathway and send the instructions to the source node 108 and/or the sink node 114.

The controller 104 may be configured to communicate with one or more nodes (e.g., source node 108, transit node(s) 112, sink node 114, etc.). For instance, the controller 104 may be configured to send instructions 126A to source node 108. In some examples, the instructions may comprise access control list (ACL) classification(s). For instance, the ACL classifications may identify specific flows of customer data traffic within a VPN service. In this example, the instructions 126A may enable the source node 108 to perform real-time measurement on the specific flows identified by the ACL classifications.

In some examples, the controller 104 may be configured to send instructions 126B to sink node 114. In some examples, the instructions 126B may comprise a command to create one or more bin(s). For instance, the one or more bin(s) may correspond to latency bin(s) and/or counters generated by hardware on the sink node.

In some examples, the source node 108 may comprise a packet module 110. In some examples, the packet module 110 is configured to receive data packet(s) 128 from a user device(s) 106 associated with customer data traffic (e.g., such as a customer accessing a particular service, such as endpoint(s) 134 (e.g., internet site, application, etc.) via a VPN connection. In some examples, such as where network connection comprises an L2 connection, the data packet(s) 128 may comprise a MAC address header and a payload. For instance, the data packet(s) 128 may have the following format: <MAC><Payload>. In some examples, such as where network connection comprises an L3 IPv4 connection, the data packet(s) 128 may correspond to an IPv4 data packet. For instance, the data packet(s) 128 may have the following format: <IPv4-Customer (in VRF)><Payload>. In some examples, such as where network connection comprises an L3 IPv6 connection, the data packet(s) 128 may correspond to an IPv6 data packets. For instance, the data packet(s) 128 may have the following format: <IPv6-Customer (in VRF)><Payload>.

The packet module 110 may be configured to sample a portion of the data packet(s) 128. For instance, the packet module 110 may sample the data packet(s) 128 by copying a subset of the data packet(s) 128. The packet module 110 may generate, using the copied subset, measurement packet(s) 130. In some examples, generating the measurement packet(s) 130 comprises encapsulating each data packet using IPv6 uSID encapsulation. In some examples, encapsulating comprises adding one or more headers, such as a path tracing header, a passive IPv6 destination option, a passive IPv6 hop-by-hop option, etc.

For instance, in some examples, such as where network connection comprises an L2 VPN connection, the measurement packet(s) 130 may comprise the following: <IPv6/SRv6 uSID Encap, END.uDT2><Passive IPv6 HBH Option><Passive IPv6 Destination Option><MAC><Payload>. In some examples, such as where network connection comprises an L3 IPv4 connection, the measurement packet(s) 130 may comprise the following: <IPv6/SRv6 uSID Encap, END.uDT4><Passive IPv6 HBH Option><Passive IPv6 Destination Option><IPv4-Customer (in VRF)><Payload>. In some examples, such as where network connection comprises an L3 IPv6 connection, the measurement packet(s) 130 may comprise the following: <IPv6/SRv6 uSID Encap, END.uDT6><Passive IPv6 HBH Option><Passive IPv6 Destination Option><IPv6-Customer (in VRF)><Payload>.

In some examples, such as example system 100A of FIG. 1A, the packet module 110 at the source node 108 is configured to sample and replicate customer data packets for measurement. In this example, one copy of the data packet is sent with normal encapsulation to the sink node. Another copy is sent with path tracing (destination and hop-by-hop option) encapsulation to the sink node for measurement. In this example, packet module 110 of the source node 108 may track of how many measurement packets are sent to the sink node 114. Moreover, by utilizing the packet module 110 for encapsulating sampled data traffic, the techniques described herein enable measurement packet(s) 128 to mimic the data packet(s) 128, contain the same ECMP hash, and follow the same pathways as the data packet(s) 128, without requiring additional and/or special endpoint SID behavior.

In some examples, and as described in FIG. 1B below, the packet module 110 may additionally or alternatively be configured to generate probe packet(s) and/or test packet(s).

In some examples, the source node 108 is configured to send the measurement packet(s) 130 to the sink node for measurement. In some examples, the Path Tracing IPv6 Destination option is added to measurement packet(s) 130 to enable the measurement packet(s) 130 to carry a 64-bit timestamp, alternate marking, Sequence number, etc. In this example, the system may add the IPv6 Destination Option header to data packet(s) 128 is at line rate, such that there is no PPS impact or packet recycling that occurs on the hardware of the sink node 114.

In some examples, the sink node 114 may comprise one or more modules including packet module 110, hardware module 116, hardware analytics engine 118, and/or notification module 120. For instance, in some examples, the sink node 114 may be configured to receive the data packet(s) 128, sample the data packet(s) 128, and generate measurement packet(s) 130. As noted above, the sink node 114 comprises a packet module 110 and is configured to perform sampling and measurements of the data packet(s) 128. Traditionally, packet sampling focuses on and/or occurs at the source node 108. However, the source node 108 is not aware of the processing capabilities of the sink node 114 and/or how many other nodes are sending traffic towards the same sink node 114. Accordingly, in an example embodiment, the sink node 114 is configured to include the measurement IPv6 Destination Option in all the data traffic that matches that particular ACL. The sink node 114 may sample based on processing capabilities of hardware of the sink node. In this example, the packet module 110 of the sink node 114 still performs a packet count before sampling to be able to track with packet transmitted by the source node 108 and detect packet loss.

In some examples, the hardware module 116. In some examples, the hardware module is configured to receive one or more of data traffic, measurement packet(s), and/or test packet(s). In some examples, the hardware module is configured to process the packet(s). For instance, the hardware module may be configured to determine, based at least in part on the headers of the packet(s), whether to perform analytics on the packet(s). For instance, measurement packet(s) may be identified based on detecting the presence of an IPv6 destination option header, indicating that the packet is a measurement packet directed to the hardware analytics engine. For data packet(s) (e.g., customer data traffic that is not copied), the hardware module may forward the data packet(s) to endpoint(s) 134 using encapsulation techniques.

In some examples, the hardware module 116 is configured to decapsulate the packet(s). For instance, the hardware module may decapsulate the IPv6 header, remove the SRH and IPv6 Destination Option. For packet(s) that comprise an IPv6 destination option, the hardware module may forward the packet(s) to the hardware analytics engine for processing.

In some examples, the hardware analytics engine 118. In some examples, the hardware analytics engine is configured to receive the data packet(s), measurement packet(s), and/or test packet(s) and ingest the data using a NPU host processor. In some examples, the hardware analytics engine may comprise a C8000 platform such as Cisco's Silicon one ASIC. In some examples, the hardware analytics engine may locally ingest probes in hardware analytics for latency and loss measurement. For instance, the hardware analytics engine may comprise a plurality of latency bins and/or traffic counters. For instance, the hardware analytics module may comprise 60 latency bins, or any suitable number of bins. In some examples, the latency bins may be mapped to one or more histogram bins. In some examples, the histogram bins may be populated using the timestamps from the packets.

In some examples, the histogram bins may be dynamically re-calibrated based on expected latency values. In some examples, the hardware analytics engine may adapt a number of hardware resource counters (which are scarce resources) based on need to zoom into histogram bins across ECMPs when multi-peak (i.e., multi-mode graph) detected. In some examples, a user may configure one or more of the latency bins, median value of a latency bin threshold, etc. In some examples, the hardware analytics module is configured to set threshold values for each latency bin, detect miscalibrations of the thresholds, and update the median value.

In some examples, the notification module 120. In some examples, the notification module is configured to generate notifications. For instance, in some examples, a PTP clock sync required between source and sink nodes for latency and telemetry triggers at the same time. In this example, when the sink node initially receives a first measurement packet and/or a first test packet, a liveness state may be initially declared up. The notification module may determine a time interval associated with receiving packet(s). For example, the time interval for a non ECMP pathway may comprise 10 ms. In this example, if the sink node has not received a packet within 10 msec timer, liveness is declared down. The notification module may then generate a notification of liveness failure and send the notification directly from the sink node to the source node, for example to trigger protection switchover. ECMP pathway time intervals may vary. Accordingly, a time interval for ECMP pathways may comprise 200 ms, although any suitable time interval may be used. The notification module may also determine the liveness as down based on amount of packet loss, for example, 3% packet loss in an interval.

In some examples, such as where the network corresponds to a time sensitive network, a user may define a time interval (e.g., a deadline), which may be added to the measurement packet(s) and/or test packet(s). In this example, as the measurement packet(s) and/or test packet(s) traverse from the source node to transit node(s), each transit node will compare the timestamp of when the packet is received to the deadline. Where the deadline has expired, the transit node will drop the packet.

In some examples, sink node 114 may be configured to send telemetry data 132 to administrator device(s) 122 and/or application 124. In some examples, the telemetry data 132 may be generated by the hardware analytics engine. In some examples, the telemetry data 132 may comprise one or more histograms and/or one or more histogram bin(s). In some examples, the telemetry data may comprise latency data, liveliness data, and packet loss data associated with each ECMP pathway. In some other examples, the telemetry data may comprise of percentile metric values.

In some examples, the telemetry data 132 is generated based on the latency bins and/or counters (associated with traffic loss). In some examples, the sink node 114 may use the transmitted packets during a period, and received packets in all the bins, measure packet loss. In some examples, the sink node 114 may determine, based on the packets received status, a liveness state and notify, via the notification module, the source node. In some examples, the telemetry data may be generated on source and sink nodes at the same time, and output based on a time interval (e.g., every 15 minutes, 10 minutes, or any other suitable time period) between peer-to-peer PTP or NTP clock synced nodes.

While not illustrated, in some examples, source node 108 may additionally or alternatively comprise one or more of hardware module 116, hardware analytics engine 118, and/or notification module 120.

At "1", the system may receive data traffic. For instance, the data traffic may comprise data packet(s) 128 associated with a customer traffic flow within a VPN service.

At "2", the system may sample the data traffic and generate measurement packet(s). For instance, the system may sample the data traffic and/or generate measurement packet(s) using the packet module 110 at the source node 108 and/or the sink node 114.

At "3", the system may generate, using hardware of the sink node, telemetry data based on the measurement packet(s) and/or the data packet(s). For instance, the system may generate the telemetry data using one or more of the hardware module 116 and/or the hardware analytics engine 118.

At "4", the system may output the telemetry data for display and/or notification(s). For instance, the system may output the telemetry data to application 124, where histograms and other telemetry data associated with the network may be displayed. The system may also output notification(s) using notification module 120.

In this way, the system may provide a unified solution at the sink node for active path tracing probes and passive measurement of latency, loss, and liveliness. For instance, the system may enable sampling and copy of customer data packets at source node (ingress PE) for generating measurement packets that match customer flow for ECMP pathways. Further, by performing packet sampling for measurement of customer traffic at the sink node and based on hardware capabilities of the sink node, the system improves network capabilities by preventing the sink node from being overloaded by the source node, as in traditional techniques. Further, the system provides new behavior to support time sensitive networks, such that packets can be dropped in real time along a pathway, based on a deadline being reached, thereby freeing up bandwidth in real time.

Figure 1B:
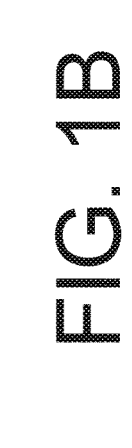
FIG. 1B illustrates a system-architecture diagram of an environment in which a system can perform active path tracing and/or liveliness, loss, and latency measurements within a VRF.

FIG. 1B illustrates a system-architecture diagram of an example environment in which a system 100B can perform active path tracing and/or liveliness, loss, and latency measurements within a VRF. Similar to FIG. 1A, the system 100B of FIG. 1B includes controller 104, source node 108, packet module 110, transit node(s) 112, sink node(s) 114, hardware module 116, hardware analytics engine 118, notification module 120, administrator device(s) 122, and application 124.

The system 100B of FIG. 1B corresponds to an exemplary test environment (e.g., such as a VRF), that can be created to perform path tracing for active one-way latency and packet loss measurement with liveness detection and/or active one-way latency and packet loss measurement with liveness detection using OWAMP.

As illustrated in FIG. 1B, the controller 104 may sending instructions 124A to the source node 108. In this example, the instructions 124A may comprise instructions to create a VRF and/or create one or more session(s). In some examples, the instruction(s) 124A further comprise a user-defined time interval. The controller 104 may also send instructions 124B to sink node 114. In this example, the instructions 124B may comprise a command to create one or more session(s) and bin(s).

The source node 108 may be further configured to send counter data 136 to the application 124. In some examples, the counter data may comprise packet counters associated with how many test packet(s) were generated and/or sent by the source node 108.

Further, in exemplary system 100B, when the test packet(s) 128 are received and processed by the sink node, the sink node may output telemetry data 132 and/or notification(s) 138 and the session may terminate.

At "1", the system may generate probe packet(s). For instance, the system may generate probe packet(s) using packet module 110 at the source node 108.

At "2", the system may generate test packet(s) by encapsulating the probe packet(s). For instance, the system may generate the test packet(s) using packet module 110. In particular, as noted above, the test packet(s) may be generated to mimic customer data packets by performing the same encapsulation as used on customer data traffic and by utilizing SRv6 uSID encapsulation.

With regard to path tracing, the test packets are generated to carry timestamp, interface ID and interface load in newly defined IPv6 destination option that does not rely on SRH.TLV (as in existing techniques). Moreover, when hashing the flow label in the path tracing embodiment (described in greater detail with regard to FIGS. 2A-2D below), the path tracing techniques ensure that the test packet(s) utilize the same hash as customer data traffic. For instance, the transit node(s) 112 determine the outgoing interface based on flow hash. The flow hash uses several fields of the packet. To make sure the computed hash over the probe packet mimics the computed hash over the customer packet, the techniques described herein define a new hash behavior at the transit nodes. This behavior includes only the common fields between customer packet and the probe packet and excludes any fields (for example next-header field in the IPv6 header) that will cause friction. Accordingly, the test packet(s) 128 may enable the system to provide more accurate outputs.

At "3", the system may generate, using hardware of the sink node, telemetry data based on the test packet(s). For instance, the system may generate the telemetry data based on using one or more of the hardware module 116 and/or hardware analytics engine 118. As noted above, the hardware module 116 may direct the test packet(s) to the hardware analytics engine 118 based at least in part on the IPv6 Option Destination value and/or UDP destination value indicated in the header of the test packet(s) 128.

At "4", the system may output telemetry data for display and/or notification(s). For instance, the system may output telemetry data 132 to application 124. In some examples, the telemetry data is generated by the hardware analytics engine 118. In some examples, the analytics may further correlate the telemetry data with routing topology and path information to provide intelligent data and dynamic calibration for detecting anomaly issues related to ECMP pathways.

In this way, the system may utilize OWAMP probe packets that are extended to use Hop-By-Hop option (including IOAM, Path Tracing or future data recording) for measurement that uses the same encapsulation as customer data traffic and eliminates the need to sample data traffic, thereby avoiding scaling problems based on data traffic flowing at line rate, accounting for MTU to avoid dropping customer traffic, performance impacts caused by sampling traffic, etc. Moreover, the system enables identification of problems within each particular ECMP pathway and offers finer granularity by identifying particular hops within a ECMP pathway at which a problem has occurred. Further, by creating a VRF environment for measurement and creating a new hash behavior (including for example using the same next-header field), the system provides test packets that mimic customer data traffic, thereby providing the same experience as customer packets, accurate measurements, and scalability within a network.

Figure 2A:
FIGS. 2A-2D illustrate an example environment and exemplary test packets associated with the system described in FIG. 1B.
Figures 2B, 2C, 2D:
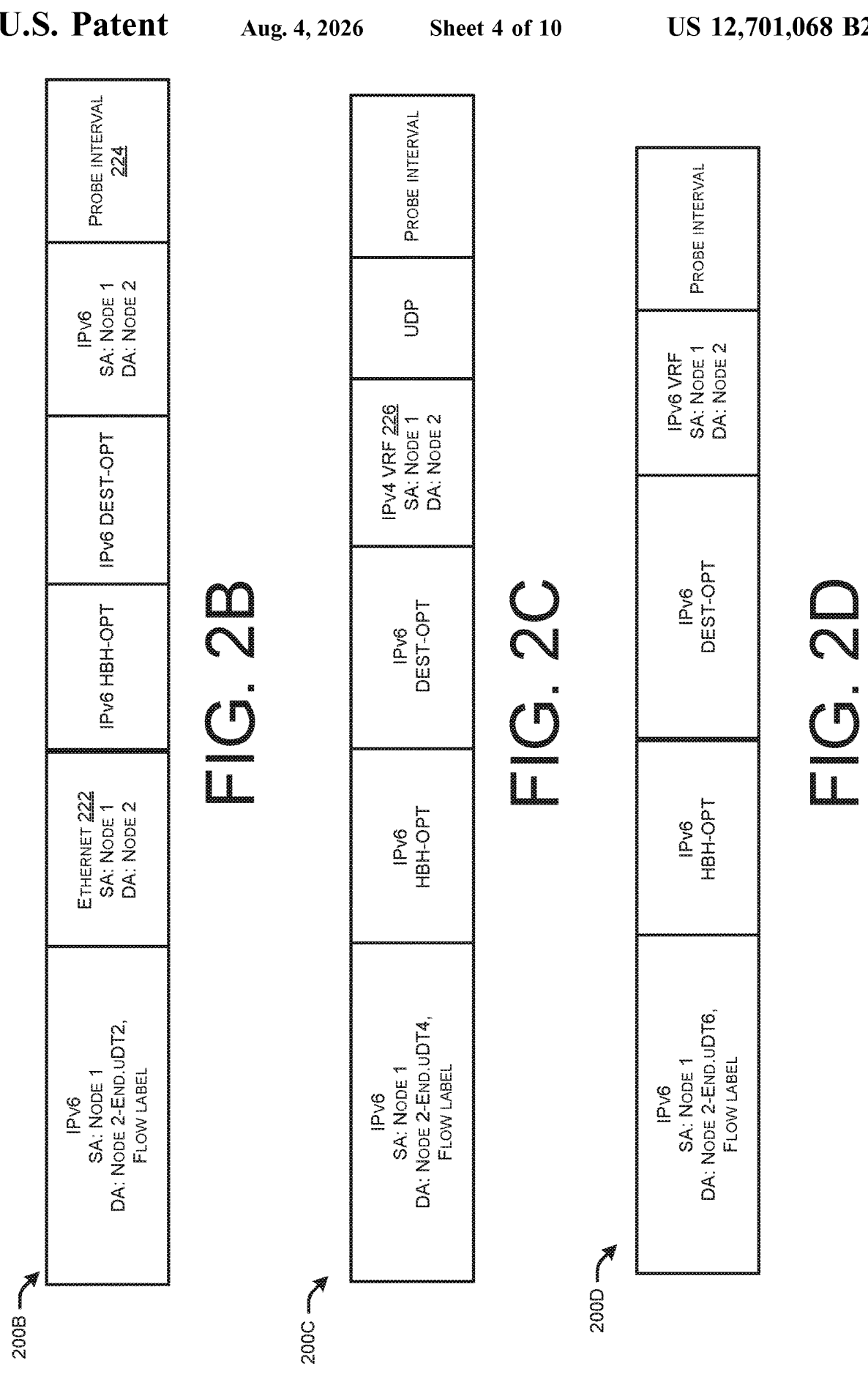

FIG. 2A illustrates an example test environment 200A for enabling path tracing for active one-way latency and packet loss measurement with liveliness detection, in accordance with the system described in FIG. 1B. FIGS. 2B-2D illustrate exemplary test packet(s) that may be generated by a source node 108 (illustrated as node 1 in FIG. 2A).

As illustrated in FIG. 2A, the test environment 200A may comprise a network 202. The network 202 may correspond to a VRF. In some examples, the network 202 comprises a path tracing VRF to monitor IPv6, IPv4, and/or Ethernet services. As illustrated, a user 204 may correspond to an operator of a network, such as a network administrator. In some examples, the user 204 may send instructions 206 to node 1 (e.g., source node 108). In this example, the instructions 206 may comprise commands to configure a path tracing session and/or commands for node 1 to generate path tracing probe packets. In some examples, the instructions 206 may further comprise a probe deadline time interval. As noted above, node 1 may comprise packet module 110, which may generate the path tracing probe packets. In some examples, the path tracing probe packets comprise one of the following formats <IPv6 (VRF)>. (for L3 IPv6 VPN connections); <IPv4 (VRF)> (for L3 IPv4 VPN connections); and/or <L2-MAC> (for L2 VPN connections).

In some examples, one or more transit node(s) (not illustrated) may be located between node 1 and node 2. The transit node(s) may comprise node(s) that performs plain IPv6 forwarding (or segment routing endpoint processing) and in addition records path tracing information in the HBH-Path Tracing Option. In some examples, node 2 corresponds to a sink node 114 that comprises a node that receives PT probes sent from the source node containing the information recorded by every PT Midpoint (transit) node along the path and forwards them to a regional collector after recording its PT information.

In some examples, node 1 may perform IPv6/SRv6 uSID encapsulation 208 on the probe packets to generate test packet(s) 128. As illustrated, the test packet(s) 128 may comprise the encapsulation 208, PT IPv6 Destination Option 210, Connection Type 212, UDP for entropy 214, and no payload 216. As illustrated, the test packet(s) 128 for path tracing do not require or contain a payload and do not contain UDP headers. Instead, the UDP for entropy 214 header is included for L3 (IPv4) VPN connections and is used to define a source port as entropy.

The encapsulation 208 performed may enable the test packet(s) 128 to mimic customer data traffic. Further, by adding a PT IPv6 Destination Option 210, the test packet(s) 128 may carry a 32-bit timestamp (nsec), alternate marking, sequence number, session ID, etc. Moreover, node 1 may remove the IPv6 next-hop field from hashing, as this field is different from what customer data packets use. Accordingly, the ECMP hashing may be limited to the source address, destination address, and/or flow label in the outer IPv6 header, thereby providing more accurate representations of customer data traffic. In some examples, node 1 generates an IPv6 flow label that is used to measure all ECMP pathways. In some examples, the flow label may be generated using part of one or more timestamps. For instance, when test packet(s) 128 are generated, a first timestamp (time 1 218) may be used to generate a flow label.

For instance, to ensure the test packet(s) 128 comprise the same hashing as a customer data packet, transit nodes (not illustrated in FIG. 2A), source node 108, etc. may perform a new hashing behavior. As an example, the flow hash includes source address, comprising [0-X] bits, destination address, comprising [0-Y] bits, and flow label, comprising [0-Z] bits. The new hashing behavior performed herein may exclude the [X-128] bits of the source address, [Y-128] bits of destination address, and [Z-20] bits of the flow label. The new hash behavior excludes the next header (NH) field as well. In this example, by excluding the X-128 upper bits of the source address, the techniques described herein ensure that if the customer packet and probe packets are sent from different loopback interfaces, they can still have the same hash. By excluding the Y-128 bits of the destination address, the techniques described herein can ensure if the customer packet and the probe packet are sent to different SIDs on the sink node, the hash is still the same. By excluding the Z-20 bits of the flow label, we can user these bits as control bits where the ingress PE (source) can encode any behavior and/or metadata. For example, the system may encode an alternate marking bit to absolute loss measurements. Accordingly, in this way, the system ensures the test packet(s) 128 mimic customer data traffic to provide accurate representations of customer data traffic experience and accurate telemetry data.

As illustrated in FIG. 2A, the test packet(s) 128 are sent to node 2, which may correspond to sink node 114. Sink node 114 may receive the test packet(s) 128 at time 2 220. In some examples, time 1 218 and time 2 220 can be compared by the node 2 to determine one-way latency of the test packet(s) 128. In some examples, node 2 may determine one-way packet loss of the test packet(s) 128 by comparing an expected number of packets (e.g., corresponding to a number of packets sent by node 1 and indicated by sequence IDs) to a number of received test packet(s).

Node 2 may further punt the test packet(s) 128 to hardware of node 2 based on a value of the PT IPv6 Destination Option. For instance, node 2 may comprise hardware module 116, hardware analytics engine 118, and/or notification module 120 described above. In some examples, node 2 may generate and output telemetry data 132 to application 124, as described in FIGS. 1A and 1B above.

In some examples, the test packets 128 are punted by node 2 using newly defined PT IPv6 Destination Option to the hardware analytics engine of node 2 for analytics that populates latency bins using the timestamps from the packets. Using the expected packets during a period, and received packets in all the bins, packet loss is measured. Based on the expected packet interval, liveness state is detected by the sink node and notified to the source node, such as by using notification module 120.

FIG. 2B illustrates an exemplary test packet 200B created for monitoring a L2 Ethernet connection. As illustrated the test packet 200B comprises IPv6 encapsulation, which includes a source address (SA), destination address (DA), and a flow label. In some examples, the SA corresponds to a MAC address at node 1, the DA corresponds to a MAC address at node 2. In some examples, as part of SRv6 uSID encapsulation, the flow label is computed in a NPU of node 1, based on a 5-tuple of the L2 packet (MAC header). In some examples, the IPv6 flow label is generated using a timestamp.

In the illustrated example, the test packet 200B comprises an inner ethernet header 222, which identifies the forwarding path of the test packet 200B. As illustrated the ethernet header 222 includes the SA and the DA.

Test packet 200B further includes an IPv6 hop-by-hop (HBH) option, IPv6 Destination Option, an inner IPv6 header, and probe interval 224. In some examples, the inner IPv6 header is optional, such that test packet 200B may not include the inner IPv6 header. In some examples, probe interval 224 corresponds to a user defined deadline time interval.

In some examples, the IPv6 HBH-Option comprises MCD data that is used by the sink node 114 when measuring latency and loss measurements. In some examples, the IPv6 Destination Option can comprise one or more of the following: an Option-Type: PT; Option Length; 64-Bit Timestamp; 16-bit Session ID; 16-bit Sequence Number; 12-Bit Interface ID; 4-Bit interface load; and/or Alternate marking bit (C).

FIG. 2C illustrates an exemplary test packet 200C created for monitoring a L3 IPv4 connection. As illustrated the test packet 200C comprises IPv6 encapsulation, which includes a source address (SA), destination address (DA), and a flow label. In some examples, the SA corresponds to a loopback address at the node 1 VRF, the DA corresponds to a loopback address at the node 2 VRF. Accordingly, the system may create measurement VRF specifically for PT packets for each IGP Flexible-Algorigt. For instance, separate path tracing measurement VRFs created each with loopbacks for different IGP Flexible-Algorithms.

In some examples, as part of the SRv6 uSID encaps, the Flow Label is computed based on a 5-tuple of the inner IPv4 packet, and hence the flow label is impacted by the UDP Source Port. In some examples, the IPv6 flow label is generated using a timestamp. For instance, the IPv6 flow label may be generated using the lower 20-bits from the time 1 timestamp.

Test packet 200C further includes an IPv6 hop-by-hop (HBH) option, IPv6 Destination Option, an inner IP header 226, UDP, and probe interval. In some examples, the inner IP header 226 carries a VRF address associated with one or more sessions and/or pathways. In some examples, probe interval 224 corresponds to a user defined deadline time interval. In some examples, the UPD comprises UDP source port and a UDP destination port. In some examples, the UDP source port may be defined as "entropy" and the UDP destination port may be user-defined.

In some examples, the IPv6 HBH-Option comprises MCD data that is used by the sink node 114 when measuring latency and loss measurements. In some examples, the IPv6 Destination Option can comprise one or more of the following: an Option-Type: PT; Option Length; 64-Bit Timestamp; 16-bit Session ID; 16-bit Sequence Number; 12-Bit Interface ID; 4-Bit interface load; and/or Alternate marking bit (C).

FIG. 2D illustrates an exemplary test packet 200D created for monitoring a L3 IPv6 connection. As illustrated the test packet 200D comprises IPv6 encapsulation, which includes a source address (SA), destination address (DA), and a flow label. In some examples, the SA corresponds to a loopback address at the node 1 VRF, the DA corresponds to a loopback address at the node 2 VRF. Accordingly, the system may create measurement VRF specifically for PT packets for each Flex-Algo. For instance, separate path tracing measurement VRFs created each with loopbacks for different Flex Algos.

In some examples, the flow label comprises a random value created at probe generation using 20-bits from timestamp. In some examples, as part of the SRv6 uSID encaps, the Flow Label is propagated from the TWAMP IPv6 header into the SRv6 uSID encaps.

Test packet 200D further includes an IPv6 hop-by-hop (HBH) option, IPv6 Destination Option, an inner IPv6 header, and probe interval. In some examples, the inner IPv6 header carries a VRF address associated with one or more sessions and/or pathways. In some examples, probe interval corresponds to a user defined deadline time interval.

In some examples, the IPv6 HBH-Option comprises MCD data that is used by the sink node 114 when measuring latency and loss measurements. In some examples, the IPv6 Destination Option can comprise one or more of the following: an Option-Type: PT; Option Length; 64-Bit Timestamp; 16-bit Session ID; 16-bit Sequence Number; 12-Bit Interface ID; 4-Bit interface load; and/or Alternate marking bit (C).

In this way, the system may perform testing within a VRF environment. For instance, by utilizing SRv6 uSID encapsulation, the system enables test packets to have same encapsulation as customer data traffic and eliminates the need to sample data traffic, thereby avoiding scaling problems based on data traffic flowing at line rate, accounting for MTU to avoid dropping customer traffic, performance impacts caused by sampling traffic, etc. Further, by creating a VRF environment for measurement and creating a new hash behavior, the system provides test packets that mimic customer data traffic, thereby providing the same experience as customer packets, accurate measurements, and scalability within a network.

Figure 3A:
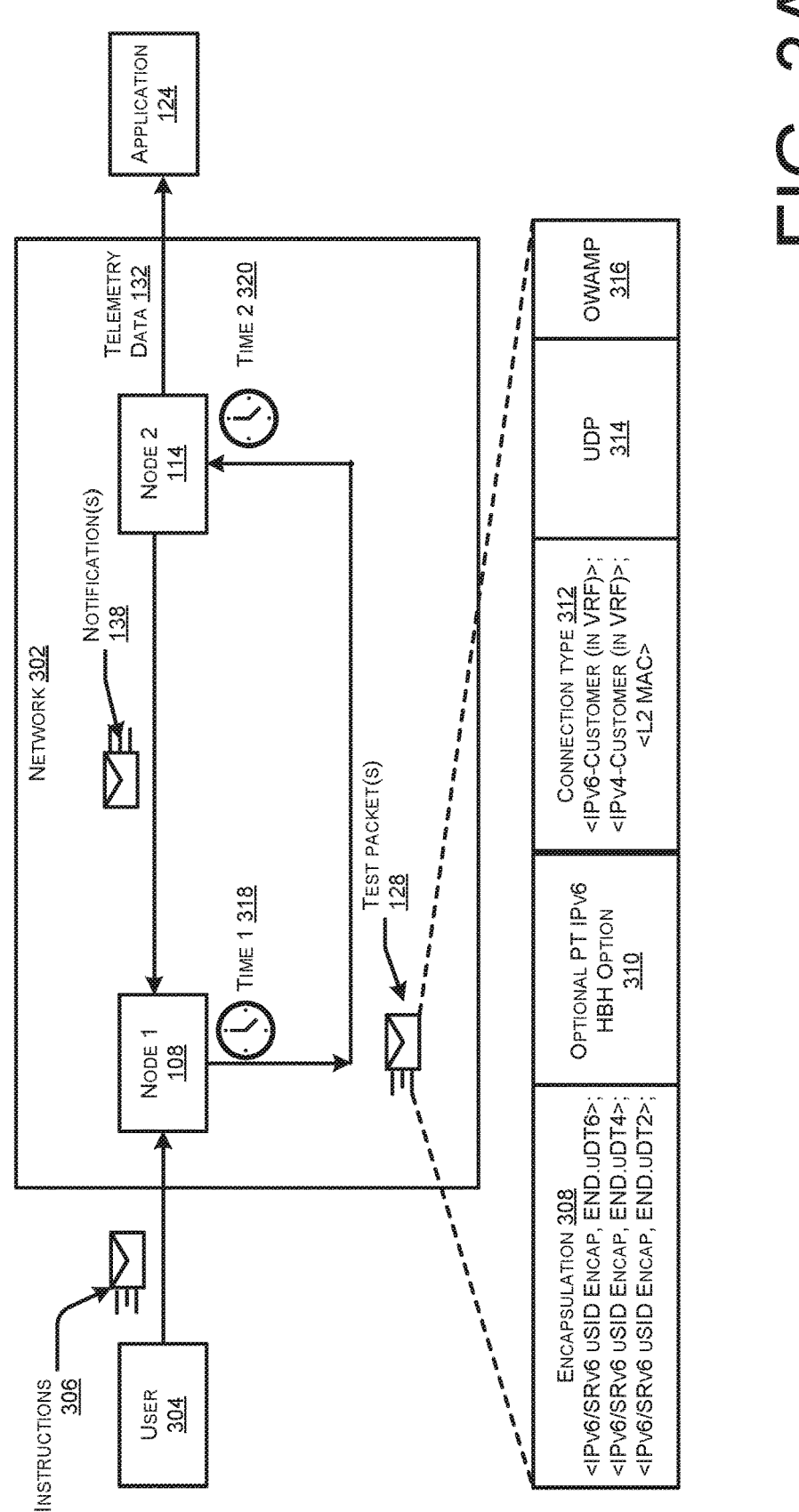

FIG. 3A illustrates an example test environment 300A for performing active one-way latency and packet loss measurement with liveness detection using one-way active measurement protocol (OWAMP), in accordance with the systems described in FIGS. 1A, 1B, and 2A-2D. FIGS. 3B-3D illustrate exemplary test packet(s) that may be generated by a source node 108 (illustrated as node 1 in FIG. 3B). While the examples described in FIGS. 3A-3D are described in reference to a test environment, the examples may also be implemented with the system described in FIG. 1A above.

As illustrated in FIG. 3A, the test environment 300A may comprise a network 302. The network 302 may correspond to a VRF. In some examples, the network 302 comprises a VRF to monitor IPv6, IPv4, and/or Ethernet services. As illustrated, a user 304 may correspond to an operator of a network, such as a network administrator. In some examples, the user 304 may send instructions 306 to node 1 (e.g., source node 108). In this example, the instructions 306 may comprise commands to configure a session and/or commands for node 1 to generate OWAMP probe packets. In some examples, the instructions 306 may further comprise a probe deadline time interval. As noted above, node 1 may comprise packet module 110, which may generate the probe packets.

In some examples, node 1 may perform IPv6/SRv6 uSID encapsulation 308 on the probe packets to generate test packet(s) 128. As illustrated, the test packet(s) 128 may comprise the encapsulation 308, optional PT IPv6 HBH option 310, connection type 312, UDP 314, and OWAMP 316.

The encapsulation 308 performed may enable the test packet(s) 128 to mimic customer data traffic. Further, by adding an optional PT IPv6 HBH option 310, the test packet(s) 128 may carry per-hop short timestamp, short interface ID and interface load. Moreover, node 1 may remove the IPv6 next-hop field from hashing, as this field is different from what customer data packets use. Accordingly, the ECMP hashing may be limited to the source address, destination address, and/or flow label in the outer IPv6 header, thereby providing more accurate representations of customer data traffic. In some examples, node 1 generates an IPv6 flow label that is used to measure all ECMP pathways. In some examples, the flow label may be generated using one or more timestamps. For instance, when test packet(s) 128 are generated, a first timestamp (time 1 318) may be used to generate a flow label. In some examples, the optional IPv6 HBH option 310 is included for hop-by-hop delay measurement and tracing packet paths in the network, as well as collecting interface load information. In some examples, the optional IPv6 HBH option 310 can be used to record Midpoint Compressed Data (MCD). In some examples, the optional IPv6 HBH option 310 comprises an Option-Type: PT (Path Tracing), Option Length; MCDs per HOP; 12-Bit Interface ID; 4-Bit Interface Load; 8-Bit Short Timestamp.

The UDP 314 may comprise a source port and a destination port. In some examples, the source port may be chosen by a source (e.g., node 1, transit node, etc.). In addition, the test packet(s) 128 comprise an OWAMP 318 payload. The OWAMP 318 may include a timestamp from node 1 and/or any transit node(s).

As illustrated in FIG. 3A, the test packet(s) 128 are sent to node 2, which may correspond to sink node 114. Sink node 114 may receive the test packet(s) 128 at time 2 320. In some examples, time 1 318 and time 2 320 can be compared by the node 2 to determine one-way latency of the test packet(s) 128. In some examples, node 2 may determine one-way packet loss of the test packet(s) 128 by comparing an expected number of packets (e.g., corresponding to a number of packets sent by node 1 and indicated by sequence IDs) to a number of received test packet(s).

Node 2 may further punt the test packet(s) 128 to hardware of node 2 based on a value indicated by UDP 314. For instance, the destination port value may indicate to the sink node 114 to direct the test packet(s) 128 to hardware for analytics and measurement. For instance, node 2 may comprise hardware module 116, hardware analytics engine 118, and/or notification module 120 described above. In some examples, node 2 may generate and output telemetry data 132 to application 124, as described in FIGS. 1A and 1B above.

In some examples, liveliness detection may be performed by the sink node 114. In this example, when a first test packet is received by node 2, a liveness state is initially declared as "up." In some examples, such as non-ECMP cases, a detection interval may be set at 10 ms by default. Accordingly, if node 2 does not receive another test packet within 10 msec, node 2 declares liveness is down. Node 2 may then generate a notification of liveness success/failure from sink node to source node to trigger protection switchover.

In some examples, liveliness across ECMPs on the sink node may be monitored. In this example, the sink node 114 may monitor liveness by tracking packet loss across flow labels and ECMPs. In this example, the sink node 114 may generate and send an out of band notification to the source node 108 based on an interval and packet loss threshold being hit across the ECMPs. In some examples, the liveliness interval may comprise the user defined probe interval (e.g., such as 3.3 ms) and a default interval (e.g., such as 200 ms). In this example, if no packet is received in the 200 msec interval (default), the liveness state is declared down and notification triggered. In some examples, sweeping flow labels may be tracked from one ECMP to another ECMP affects the next packet arrival time. For example, one ECMP path may have a latency of 3 msec and another ECMP path that goes around the world may have a latency of 50 msec. In this example, a first test packet may be received after a 3 msec delay on pathway 1. A second packet may be received after 50 msec delay on pathway 2. In this example, the hardware analytics engine that is measuring performance cannot use 10 msec to timeout, as there is no pipeline transmit/receive anymore and next packet can arrive 50 msec later. Accordingly, by utilizing a ECMP sweeping flow label, the system can only allow a minimum detection interval>end to end delay.

In some examples, aggregation latency and loss metrics across ECMPs can be tracked. For instance, the system may use a sweeping flow label that is generated using random using 20-bits from PTP clock (lower bits for randomization). Aggregate Counters from different LCs on the sink node for ECMPs may be tracked. In some examples, this enables zooming into the ECMPs with additional counters from different LCs.

FIG. 3B illustrates an exemplary test packet 300B created for monitoring a L2 Ethernet connection. As illustrated the test packet 300B comprises IPv6 encapsulation, which includes a source address (SA), destination address (DA), and a flow label. In some examples, the SA corresponds to a MAC address at node 1, the DA corresponds to a MAC address at node 2. In some examples, as part of SRv6 uSID encapsulation, the flow label is computed in a NPU of node 1, based on a 5-tuple of the L2 packet (MAC header). In some examples, the IPv6 flow label is generated using a timestamp. In some examples, DSCP is set to the configured value (e.g., such as default value 48, or any other suitable value).

In the illustrated example, the test packet 300B comprises an inner ethernet header 322, which identifies the forwarding path of the test packet 300B. As illustrated the ethernet header 322 includes the SA and the DA.

Test packet 300B further includes an IPv6 hop-by-hop (HBH) option, an inner IPv6 header, UDP, OWAMP 324, and probe interval 326. In some examples, the inner IPv6 header carries a VRF address associated with one or more sessions and/or pathways. In some examples, probe interval corresponds to a user defined deadline time interval. In some examples, the UDP comprises a source port (chosen by a source node) and a destination port (e.g., "862") which can be defined by a user. As noted above, the destination port can be used by the sink node to direct the test packet(s) to the hardware analytics engine. OWAMP 324 may comprise one or more timestamps, such as a timestamp at node 1. The probe interval 326 may correspond to the user-defined time interval.

FIG. 3C illustrates an exemplary test packet 300C created for monitoring a L3 IPv4 connection. As illustrated the test packet 300C comprises IPv6 encapsulation, which includes a source address (SA), destination address (DA), and a flow label. In some examples, the SA corresponds to a loopback address at the node 1 VRF, the DA corresponds to a loopback address at the node 2 VRF. Accordingly, the system may create measurement VRF specifically for PT packets for each Flex-Algo. For instance, separate path tracing measurement VRFs created each with loopbacks for different Flex Algos.

In some examples, the flow label comprises a random value created at probe generation using 20-bits from timestamp. In some examples, as part of the SRv6 uSID encaps, the Flow Label is computed in NPU based on a 5-tuple of the inner IPv4 packet, and hence the FL is impacted by the UDP Source Port. Flow-label sweeping using different UDP source port.

Test packet 300C further includes an IPv6 hop-by-hop (HBH) option, an inner IPv6 VRF header 328, UDP, OWAMP, and probe interval. In some examples, the inner IPv6 VRF header 328 carries a VRF address associated with one or more sessions and/or pathways. In some examples, probe interval corresponds to a user defined deadline time interval. In some examples, the UDP comprises a source port (chosen by a source node) and a destination port (e.g., "862") which can be defined by a user. As noted above, the destination port can be used by the sink node to direct the test packet(s) to the hardware analytics engine. OWAMP may comprise one or more timestamps, such as a timestamp at node 1. The probe interval may correspond to the user-defined time interval.

FIG. 3D illustrates an exemplary test packet 300D created for monitoring a L3 IPv6 connection. As illustrated the test packet 300D comprises IPv6 encapsulation, which includes a source address (SA), destination address (DA), and a flow label. In some examples, the SA corresponds to a loopback address at the node 1 VRF, the DA corresponds to a loopback address at the node 2 VRF. Accordingly, the system may create measurement VRF specifically for PT packets for each Flex-Algo. For instance, separate path tracing measurement VRFs created each with loopbacks for different Flex Algos.

In some examples, the flow label comprises a random value created at probe generation using 20-bits from timestamp (e.g., such as lower 20 bits). In some examples, as part of the SRv6 uSID encapsulation, the flow label is propagated in NPU from the OWAMP IPv6 header into the SRv6 uSID encapsulation.

Test packet 300D further includes an IPv6 hop-by-hop (HBH) option, an inner IPv6 VRF header 330, UDP, OWAMP, and probe interval. In some examples, the inner IPv6 VRF header 330 carries a VRF address associated with one or more sessions and/or pathways. In some examples, probe interval corresponds to a user defined deadline time interval. In some examples, the UDP comprises a source port (chosen by a source node) and a destination port (e.g., "862") which can be defined by a user. As noted above, the destination port can be used by the sink node to direct the test packet(s) to the hardware analytics engine. OWAMP may comprise one or more timestamps, such as a timestamp at node 1. The probe interval may correspond to the user-defined time interval.

In this way the system may perform testing within a VRF environment. For instance, by utilizing OWAMP probe packets that are extended to use Hop-By-Hop option (including IOAM, Path Tracing or future data recording) for measurement, the system uses the same encapsulation as customer data traffic and eliminates the need to sample data traffic, thereby avoiding scaling problems based on data traffic flowing at line rate, accounting for MTU to avoid dropping customer traffic, performance impacts caused by sampling traffic, etc. Moreover, the system enables identification of problems within each particular ECMP pathway and offers finer granularity by identifying particular hops within a ECMP pathway at which a problem has occurred.

FIG. 4 illustrates a flow diagram of an example system 400 for performing passive measurement of data traffic of a VPN service, with reference to the systems described in FIGS. 1-3. In some instances, one or more of the steps of system 400 may be performed by one or more devices (e.g., source node 108, transit node(s) 112, sink node(s) 114, etc.) that include one or more processors and one or more non-transitory computer-readable media storing computer-executable instructions that, when executed by the one or more processors, cause the one or more processors to perform operations of system 400.

At 402, the system may receive, by a sink node, data packet(s) associated with a data flow. In some examples, the sink node comprises sink node 114 described herein. In some examples, the data packet(s) comprise data packet(s) 128 and are associated with a customer data flow of a VPN service.

In some examples, the system comprises a source node, such as source node 108. In some examples, the system may include receiving, by the source node, the data packets associated with the data flow. In this example, the system may include sampling, by the source node, a portion of the data packets, wherein sampling comprises generating, by the source node, copies of a first portion of the data packets, the copies comprising the second subset based at least in part on encapsulating each of the data packets within the second subset, wherein encapsulating includes adding one or more of a path tracing header, a deadline timestamp, or a destination option header. The system may send, from the source node to the sink node, the data packets and the copies of the data packets.

In some examples, the system may include receiving, by a transit node, the copies of the data packets. The system may include determining, by the transit node and based at least in part on the deadline timestamp, that the data packet has expired. In this example, the system may include dropping, by the transit node, the data packet from the data flow.

In some examples, the sink node samples the data flow based at least in part on processing capabilities of the hardware. In this example, sampling comprises generating, by the source node, copies of a first portion of the data packets, the copies comprising the second subset based at least in part on encapsulating each of the data packets within the second subset, wherein encapsulating includes adding one or more of a path tracing header, a deadline timestamp, or a destination option header.

At 404, the system may send, based at least in part on header(s) of the data packet(s), a first subset of the data packet(s) in endpoint device(s). For instance, the sink node may comprise hardware module 116. As noted above, hardware module 116 may be configured to determine, based on the headers, that the first set of data packet(s) correspond to customer data traffic and are not directed to the hardware for measurement. In this example, the system may send the first subset of the data packet(s) to endpoint device(s) (e.g., destination of the customer data traffic).

At 406, the system may determine, based at least in part on the header(s), a second subset of the data packet(s) to ingest using hardware of the sink node. For instance, the sink node may determine that the second subset of the data packet(s) comprise measurement packet(s). As described above, the hardware module 116 may identify measurement packet(s) based on the presence of an IPv6 Destination Option header. Accordingly, the system may determine to ingest the second subset using a hardware analytics engine 118 of the sink node.

In some examples, the hardware of the sink node comprises an NPU with processing capabilities of 14 million data packets per second.

At 408, the system may generate telemetry data. For instance, telemetry data may correspond to telemetry data 132. In some examples, the telemetry data comprises a plurality of histogram bins or counters generated and measured by the hardware of the sink node. In some examples, the telemetry data comprises latency data, liveliness data, and packet loss data associated with each ECMP pathway.

At 410, the system may send the telemetry data to an application for Analytics and display. For instance, the application may correspond to application 124 and may be configured to generate and display one or more histogram graphs, an indication of liveliness within the network, etc.

In some examples, the system may include determining, by the sink node, that a time period to received second data packets associated with the data flow has expired. In this example, the system may generate, by the sink node, a liveliness state notification and send, to the source node, the liveliness state notification. For instance, the sink node may generate and send the liveliness state notification using notification module 120.

In this way, the system may provide a unified solution at the sink node for active path tracing probes and passive measurement of latency, loss, and liveliness. For instance, the system may enable sampling (e.g., tagging 1 packet out of every 1,000 packets and/or 1 packet out of every 10,000 packets, etc.) and copying of customer data packets at source node (ingress PE) for generating measurement packets that match customer flow for ECMP pathways. Further, by performing packet sampling for measurement of customer traffic at the sink node and based on hardware capabilities of the sink node, the system improves network capabilities by preventing the sink node from being overloaded by the source node, as in traditional techniques. Further, the system provides new behavior to support time sensitive networks, such that packets can be dropped in real time along a pathway, based on a deadline being reached, thereby freeing up bandwidth in real time.

Figure 5:
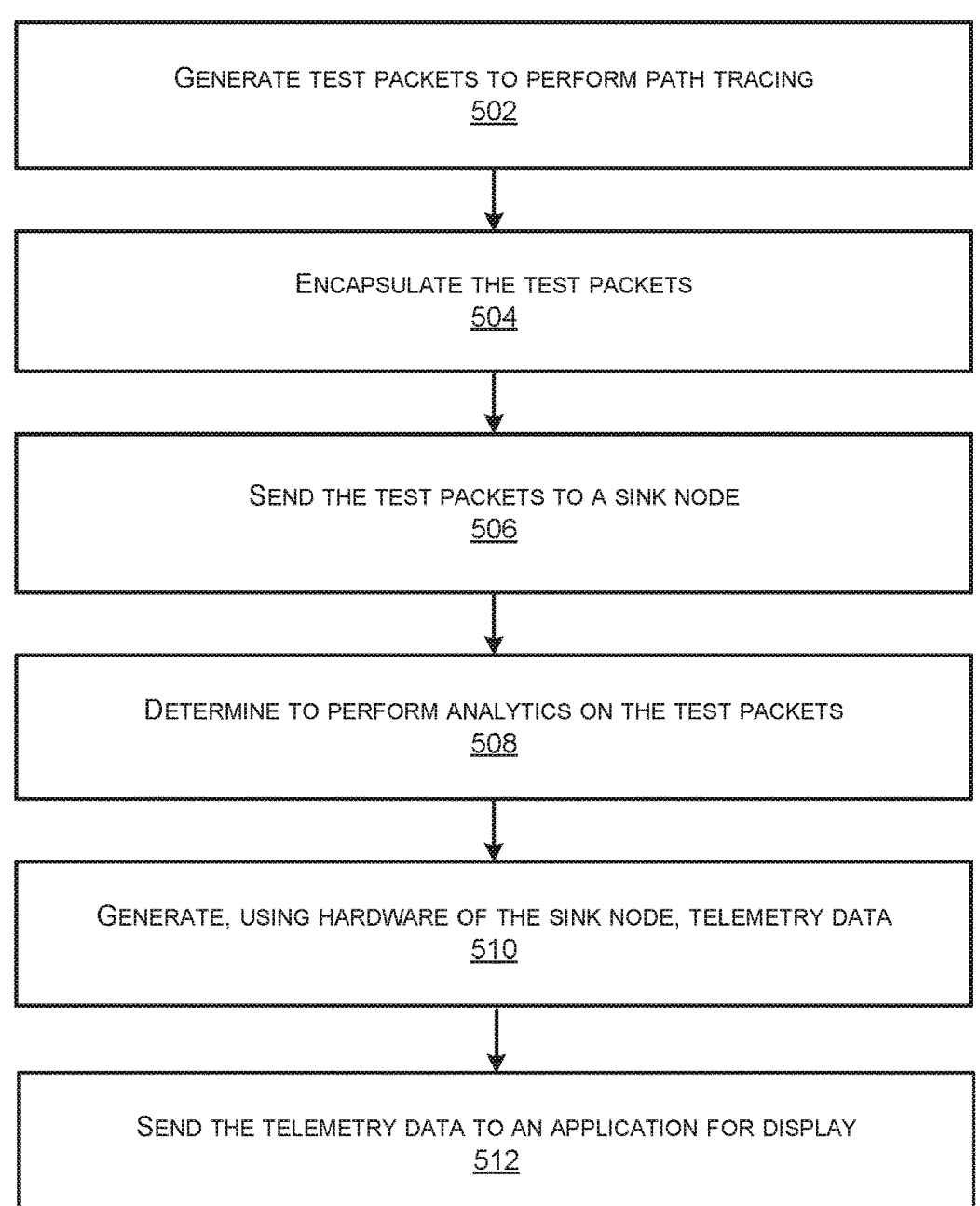
FIG. 5 illustrates a flow diagram of an example method for performing path tracing for active one-way latency and packet loss measurement with liveliness detection associated with the systems described in FIGS. 1-4.

FIG. 5 illustrates a flow diagram of an example system 500 for performing path tracing for active one-way latency and packet loss measurement with liveliness detection, in association with the systems described in FIGS. 1-4. In some instances, one or more of the steps of system 500 may be performed by one or more devices (e.g., source node 108, transit node(s) 112, sink node(s) 114) that include one or more processors and one or more non-transitory computer-readable media storing computer-executable instructions that, when executed by the one or more processors, cause the one or more processors to perform operations of system 500.

At 502, the system may generate, by a source node, probe packet(s) for monitoring latency, loss, and liveliness. In some examples, the probe packet(s) may be generated based on receiving instructions from a user to create a path tracing session and/or VRF.

At 504, the system may encapsulate the probe packet(s) to generate test packet(s). For instance, the system may encapsulate the probe packet(s) using SRv6 uSID encapsulation. In some examples, encapsulation of the probe packet(s) may be performed by packet module 110. In some examples, the test packet(s) correspond to test packet(s) 128. In some examples, the test packets are generated to mimic a customer data flow. In some examples, wherein encapsulating comprises adding a path tracing destination option to the headers of the test packets. In some examples, the path tracing destination option further includes a 32-bit timestamp, alternate marking, a sequence number, and a session ID.

At 506, the system may send the test packet(s) to a sink node. In some examples, the test packet(s) can be sent through one or more transit node(s) 112 to the sink node. In some examples, the test packet(s) are sent according to the same pathways (e.g., ECMP pathways) as customer data traffic.

At 508, the system may determine, by the sink node, to perform analytics on the test packet(s). For instance, as described above, the sink node 114 may comprise a hardware module, hardware analytics engine, and/or notification module. The sink node may determine to ingest the test packet(s) based on identifying an IPv6 Destination Option header.

At 510, the system may generate, using hardware of the sink node, telemetry data. For instance, the system may generate the telemetry data using hardware analytics engine described above. In some examples, telemetry data may correspond to telemetry data 132. In some examples, the telemetry data comprises a plurality of histogram bins or counters generated and measured by the hardware of the sink node. In some examples, the telemetry data comprises latency data, liveliness data, and packet loss data associated with each ECMP pathway. In some examples, the hardware of the sink node comprises an NPU with processing capabilities of 14 million data packets per second.

At 512, the system may send the telemetry data to an application for display. For instance, the system may send the telemetry data to application 124 as described herein. In some examples, the telemetry data may comprise indications of problems (e.g., packet loss, latency, etc.) associated with one or more ECMP pathways within the network and/or identify specific hops within an ECMP pathway where a problem is occurring.

In this way, the system the system may perform active testing within a VRF environment. For instance, by utilizing SRv6 uSID encapsulation, the system enables test packets to have same encapsulation as customer data traffic and eliminates the need to sample data traffic, thereby avoiding scaling problems based on data traffic flowing at line rate, accounting for MTU to avoid dropping customer traffic, performance impacts caused by sampling traffic, etc. Further, by creating a VRF environment for measurement and creating a new hash behavior, the system provides test packets that mimic customer data traffic, thereby providing the same experience as customer packets, accurate measurements, and scalability within a network.

Figure 6:
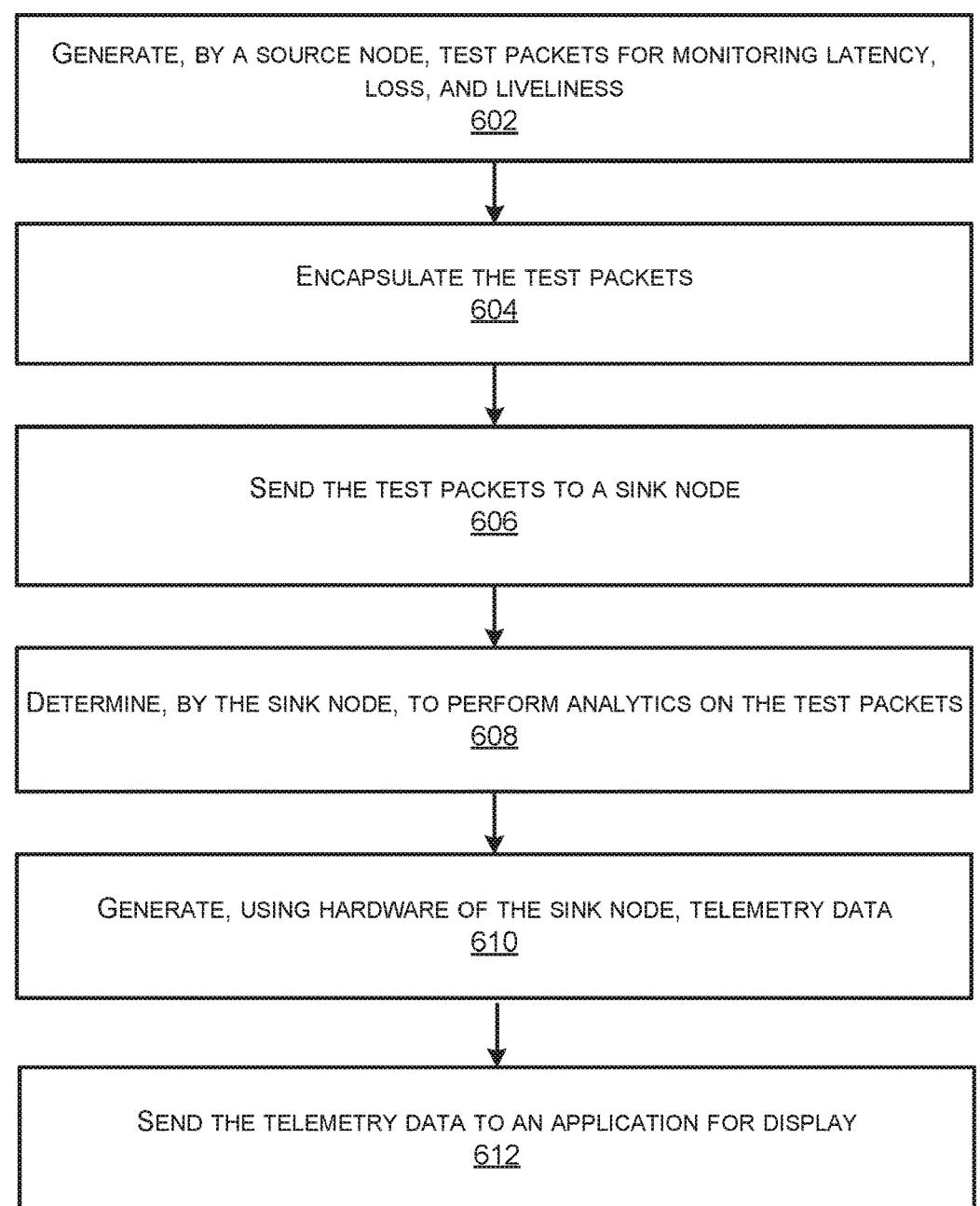
FIG. 6 illustrates a flow diagram of an example method for performing active one-way latency and packet loss measurement with liveliness detection using One-Way Active Measurement Protocol (OWAMP) (including One-Way STAMP or One-Way TWAMP) associated with the systems described in FIGS. 1-5.

FIG. 6 illustrates a flow diagram of an example system 600 for performing active one-way latency and packet loss measurement with liveliness detection using One-Way Active Measurement Protocol (OWAMP) (including One-Way STAMP or One-Way TWAMP) in association with the systems described in FIGS. 1-5. In some instances, one or more of the steps of system 600 may be performed by one or more devices (e.g., source node 108, transit node(s) 112, sink node(s) 114) that include one or more processors and one or more non-transitory computer-readable media storing computer-executable instructions that, when executed by the one or more processors, cause the one or more processors to perform operations of system 600.

At 602, the system may generate, by a source node, probe packet(s) for monitoring latency, loss, and liveliness. In some examples, the probe packet(s) may be generated based on receiving instructions from a user to create a OWAMP session and/or VRF.

At 604, the system may encapsulate the probe packet(s) to generate test packet(s). For instance, the system may encapsulate the probe packet(s) using SRv6 uSID encapsulation. In some examples, encapsulation of the probe packet(s) may be performed by packet module 110. In some examples, the test packet(s) correspond to test packet(s) 128. In some examples, the test packets are generated to mimic a customer data flow. In some examples, wherein encapsulating comprises adding a PT IPv6 HBH option and/or UDP header to the headers of the test packets. In some examples, the PT IPv6 HBH option comprises a per-hop short timestamp, a short interface ID, and an interface load.

At 606, the system may send the test packet(s) to a sink node. In some examples, the test packet(s) can be sent through one or more transit node(s) 112 to the sink node 114. In some examples, the test packet(s) are sent according to the same pathways (e.g., ECMP pathways) as customer data traffic.

At 608, the system may determine, by the sink node, to perform analytics on the test packet(s). For instance, as described above, the sink node 114 may comprise a hardware module, hardware analytics engine, and/or notification module. The sink node may determine to ingest the test packet(s) based on the UDP header. For instance, the sink node may determine to ingest the test packet(s) based on a UDP destination address being associated with the hardware analytics engine.

At 610, the system may generate, using hardware of the sink node, telemetry data. For instance, the system may generate the telemetry data using hardware analytics engine described above. In some examples, telemetry data may correspond to telemetry data 132. In some examples, the telemetry data comprises a plurality of histogram bins or counters generated and measured by the hardware of the sink node. In some examples, the telemetry data comprises latency data, liveliness data, and packet loss data associated with each ECMP pathway. In some examples, the hardware of the sink node comprises an NPU with processing capabilities of 14 million data packets per second.

At 612, the system may send the telemetry data to an application for display. For instance, the system may send the telemetry data to application 124.

In this way, the system may perform testing within a VRF environment. For instance, by utilizing OWAMP probe packets that are extended to use a HBH option (including IOAM, Path Tracing, and/or future data recording) for measurement, the system uses the same encapsulation as customer data traffic and eliminates the need to sample data traffic, thereby avoiding scaling problems based on data traffic flowing at line rate, accounting for MTU to avoid dropping customer traffic, performance impacts caused by sampling traffic, etc. Moreover, the system enables identification of problems within each particular ECMP pathway and offers finer granularity by identifying particular hops within a ECMP pathway at which a problem has occurred.

Figure 7:
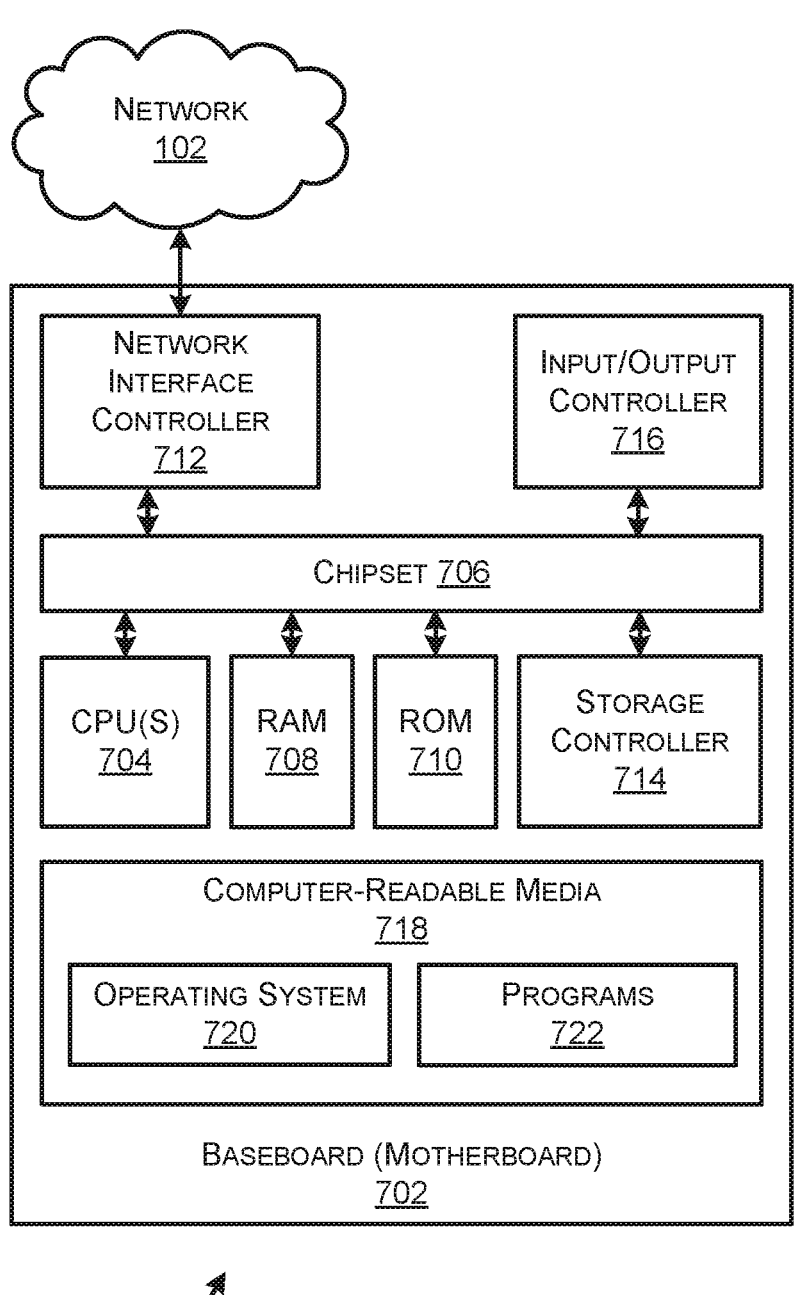
FIG. 7 is a computer architecture diagram showing an illustrative computer hardware architecture for implementing a device that can be utilized to implement aspects of the various technologies presented herein.

FIG. 7 shows an example computer architecture for a device capable of executing program components for implementing the functionality described above. The computer architecture shown in FIG. 7 illustrates any type of computer 700, such as a conventional server computer, workstation, desktop computer, laptop, tablet, network appliance, e-reader, smartphone, or other computing device, and can be utilized to execute any of the software components presented herein. The computer may, in some examples, correspond to a controller 104, source node 108, transit node(s) 112, sink node 114, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 700 includes a baseboard 702, or "motherboard," which is a printed circuit board to which a multitude of components or devices can be connected by way of a system bus or other electrical communication paths. In one illustrative configuration, one or more central processing units ("CPUs 704") operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as network 102. The chipset 706 can include functionality for providing network connectivity through a NIC 712, such as a gigabit Ethernet adapter. The NIC 712 is capable of connecting the computer 700 to other computing devices over the network 102. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the controller 104, source node 108, transit node(s) 112, sink node 114, and/or any components included therein, may be supported by one or more devices similar to computer 700. Stated otherwise, some or all of the operations performed by the controller 104, source node 108, transit node(s) 112, sink node 114, and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of a controller 104 and/or any other device. The computer 700 may include one or more hardware processors (processor(s), such as CPUs 704) configured to execute one or more stored instructions. The processor(s) may comprise one or more cores. Further, the computer 700 may include one or more network interfaces configured to provide communications between the computer 700 and other devices, such as the communications described herein as being performed by the controller 104 and/or any other device. The network interfaces may include devices configured to couple to personal area networks (PANs), wired and wireless local area networks (LANs), wired and wireless wide area networks (WANs), SDWANs, and so forth. For example, the network interfaces may include devices compatible with Ethernet, Wi-Fi™, and so forth.

The programs 722 may comprise any type of programs or processes to perform the techniques described in this disclosure. For instance, the programs 722 may cause the computer 700 to perform techniques including receiving, by a sink node within the VPN and from a source node, data packets associated with a data flow of a customer; sending, based at least in part on headers of the data packets, a first subset of the data packets to one or more endpoint devices; determining, based at least in part on the headers of the data packets, a second subset of the data packets to ingest subset using hardware of the sink node; generating, based at least in part on ingesting the second subset of the data packets, telemetry data; and sending, to an application on a user device, the telemetry data, wherein the telemetry data is displayed via a user interface of an application.

Additionally, the programs 722 may cause the computer 700 to perform techniques including generating, by a source node and within the VRF, probe packets to monitor latency, loss, and liveliness; encapsulating, by the source node, the probe packets to generate test packets, wherein encapsulating comprises adding a path tracing destination option to the headers of the test packets; sending, from the source node and to a sink node, the test packets; determining, by the sink node and based at least in part on the headers, to perform analytics on the test packets; generating, using hardware of the sink node, telemetry data associated with the test packets; and sending, to an application on a user device, the telemetry data for display.

Further, the programs 722 may cause the computer 700 to perform techniques including generating, by a source node, test packets to monitor latency, loss, and liveliness on a sink node; encapsulating, by the source node, the test packets, wherein encapsulating comprises adding a UDP header; sending, from the source node and to the sink node, the test packets; determining, by the sink node, to perform analytics on the test packets; generating, by the sink node and using hardware of the sink node, telemetry data; and sending, to an application of a user device, the telemetry data for display.

In this way, the computer 700 may provide a unified solution at the sink node for active path tracing probes and passive measurement of latency, loss, and liveliness. For instance, the system may enable sampling (e.g., tagging 1 packet out of every 1,000 packets and/or 1 packet out of every 10,000 packets, etc.) and copying of customer data packets at source node for generating measurement packets that match customer flow for equal cost multi-path (ECMP) pathways. Further, by performing packet sampling for measurement of customer traffic at the sink node and based on hardware capabilities of the sink node, the system improves network capabilities by preventing the sink node from being overloaded by the source node, as in traditional techniques. Further, the system provides new behavior to support time sensitive networks, such that packets can be dropped in real time along a pathway, based on a deadline being reached, thereby freeing up bandwidth in real time.

Moreover, the computer 700 may perform active testing within a VRF environment. For instance, by utilizing OWAMP probe packets that are extended to use Hop-By-Hop (HBH) option (including IOAM, Path Tracing or future data recording) for measurement, the system uses the same encapsulation as customer data traffic and eliminates the need to sample data traffic, thereby avoiding scaling problems based on data traffic flowing at line rate, accounting for MTU to avoid dropping customer traffic, performance impacts caused by sampling traffic, etc. Moreover, the system enables identification of problems within each particular ECMP pathway and offers finer granularity by identifying particular hops within a ECMP pathway at which a problem has occurred. Further, by creating a VRF environment for measurement and creating a new hash behavior, the system provides test packets that mimic customer data traffic, thereby providing the same experience as customer packets, accurate measurements, and scalability within a network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for performing passive measurement of customer data traffic within a virtual private network (VPN), the method comprising:

receiving, by a source node, data packets associated with a data flow of a customer;

sampling, by the source node, a portion of the data packets, wherein sampling comprises:

generating, by the source node, copies of a first portion of the data packets based at least in part on encapsulating each of the data packets within the first portion, wherein encapsulating includes adding one or more of a path tracing header, a deadline timestamp, or a destination option header; and sending, from the source node to a sink node within the VPN, the data packets and the copies of the data packets;

receiving, by the sink node, the data packets and the copies of the data packets;

identifying, by the sink node and based at least in part on an Internet Protocol version 6 (IPv6) destination option included in headers of the copies of the data packets, the copies as a subset of the data packets for measurement;

duplicating, by the sink node, the headers of the subset of the data packets;

determining to ingest the headers of the subset of the data packets using hardware of the sink node;

generating, by the hardware and based at least in part on the headers, telemetry data indicative of a performance metric of the data packets; and sending, to an application on a user device, the telemetry data.

2. The method of claim 1, further comprising:

receiving, by a transit node, the copies of the data packets;

determining, by the transit node and based at least in part on the deadline timestamp included in a data packet of the copies of the data packets, that the data packet has expired; and dropping, by the transit node, the data packet from the data flow.

3. The method of claim 1, wherein the telemetry data comprises a plurality of histogram bins or counters generated and measured by the hardware of the sink node.

4. The method of claim 1, wherein the sink node samples the data flow based at least in part on processing capabilities of the hardware.

5. The method of claim 4, wherein sampling comprises:

generating, by the source node, copies of a first portion of the data packets, the copies comprising a second subset based at least in part on encapsulating each of the data packets within the second subset, wherein encapsulating includes adding one or more of a path tracing header, a deadline timestamp, or a destination option header.

6. The method of claim 1, wherein the hardware of the sink node comprises an NPU with processing capabilities of millions of data packets per second.

7. The method of claim 1, further comprising:

determining, by the sink node, that a time period to received second data packets associated with the data flow has expired;

generating, by the sink node, a liveliness state notification; and sending, to the source node, the liveliness state notification.

8. The method of claim 1, wherein the telemetry data comprises latency data, liveliness data, and packet loss data associated with each ECMP pathway.

9. A system comprising:

one or more processors; and one or more computer-readable media storing instructions that, when executed by the one or more processors, cause the one or more processors to perform operations comprising:

receiving, by a source node, data packets associated with a data flow of a customer;

sampling, by the source node, a portion of the data packets, wherein sampling comprises:

generating, by the source node, copies of a first portion of the data packets based at least in part on encapsulating each of the data packets within the first portion, wherein encapsulating includes adding one or more of a path tracing header, a deadline timestamp, or a destination option header; and sending, from the source node to a sink node within a virtual private network (VPN), the data packets and the copies of the data packets;

receiving, by the sink node, the data packets and the copies of the data packets;

identifying, by the sink node and based at least in part on an Internet Protocol version 6 (IPv6) destination option included in headers of the copies of the data packets, the copies as a subset of the data packets for measurement;

duplicating, by the sink node, the headers of the subset of the data packets;

determining to ingest the headers of the subset of the data packets using hardware of the sink node;

generating, by the hardware and based at least in part on the headers, telemetry data indicative of a performance metric of the data packets; and sending, to an application on a user device, the telemetry data.

10. The system of claim 9, the operations further comprising:

receiving, by a transit node, the copies of the data packets;

determining, by the transit node and based at least in part on the deadline timestamp included in a data packet of the copies of the data packets, that the data packet has expired; and dropping, by the transit node, the data packet from the data flow.

11. The system of claim 9, wherein the telemetry data comprises a plurality of histogram bins or counters generated and measured by the hardware of the sink node.

12. The system of claim 9, wherein the telemetry data comprises latency data, liveliness data, and packet loss data associated with each ECMP pathway.

13. The system of claim 9, wherein the hardware of the sink node comprises an NPU with processing capabilities of millions of data packets per second.

14. The system of claim 9, wherein the sink node samples the data flow based at least in part on processing capabilities of the hardware.

15. The system of claim 14, wherein sampling comprises:

generating, by the source node, copies of a first portion of the data packets, the copies comprising a second subset based at least in part on encapsulating each of the data packets within the second subset, wherein encapsulating includes adding one or more of a path tracing header, a deadline timestamp, or a destination option header.

16. The system of claim 9, the operations further comprising:

determining, by the sink node, that a time period to received second data packets associated with the data flow has expired;

generating, by the sink node, a liveliness state notification; and sending, to the source node, the liveliness state notification.

17. One or more non-transitory computer-readable media maintaining instructions that, when executed by one or more processors, program the one or more processors to perform operations comprising:

receiving, by a source node, data packets associated with a data flow of a customer;

sampling, by the source node, a portion of the data packets, wherein sampling comprises:

generating, by the source node, copies of a first portion of the data packets based at least in part on encapsulating each of the data packets within the first portion, wherein encapsulating includes adding one or more of a path tracing header, a deadline timestamp, or a destination option header; and sending, from the source node to a sink node within a virtual private network (VPN), the data packets and the copies of the data packets;

receiving, by the sink node, the data packets and the copies of the data packets;

identifying, by the sink node and based at least in part on an Internet Protocol version 6 (IPv6) destination option included in headers of the copies of the data packets, the copies as a subset of the data packets for measurement;

duplicating, by the sink node, the headers of the subset of the data packets;

determining to ingest the headers of the subset of the data packets using hardware of the sink node;

generating, by the hardware and based at least in part on the headers, telemetry data indicative of a performance metric of the data packets; and sending, to an application on a user device, the telemetry data.

18. The one or more non-transitory computer-readable media of claim 17, wherein the sink node samples the data flow based at least in part on processing capabilities of the hardware.

* * * * *